United States Patent
Li et al.

(10) Patent No.: US 10,680,839 B2
(45) Date of Patent: Jun. 9, 2020

(54) DATA TRANSMISSION USING MULTIPLE CHANNELS WITH DISTINCT DATA TRANSMISSION PROTOCOLS

(71) Applicant: Tencent Technology (Shenzhen) Company Limited, Shenzhen (CN)

(72) Inventors: Shuxin Li, Shenzhen (CN); Yingkun Xi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/683,295

(22) Filed: Aug. 22, 2017

(65) Prior Publication Data
US 2017/0373864 A1   Dec. 28, 2017

Related U.S. Application Data

(63) Continuation of application No. PCT/CN2016/086170, filed on Jun. 17, 2016.

(30) Foreign Application Priority Data

Jul. 15, 2015 (CN) .......................... 2015 1 0417301

(51) Int. Cl.
*H04L 12/18* (2006.01)
*H04L 1/08* (2006.01)
(Continued)

(52) U.S. Cl.
CPC ................ *H04L 12/18* (2013.01); *H04L 1/08* (2013.01); *H04L 12/1877* (2013.01); *H04L 47/32* (2013.01); *H04L 2001/0096* (2013.01)

(58) Field of Classification Search
CPC ..... H04L 12/18; H04L 12/1877; H04L 47/32; H04L 1/00; H04L 2001/0096
See application file for complete search history.

(56) References Cited

U.S. PATENT DOCUMENTS

2003/0147377 A1   8/2003  Saint Etienne et al.
2007/0036106 A1*  2/2007  Karl ...................... H04L 47/125
                                                        370/331
(Continued)

FOREIGN PATENT DOCUMENTS

CN         101009663 A    8/2007
CN         101616167 A    12/2009
(Continued)

OTHER PUBLICATIONS

International Search Report and Written Opinion dated Aug. 26, 2016 for PCT Application No. PCT/CN2016/086170, 19 pages.
(Continued)

*Primary Examiner* — Christopher M Crutchfield
*Assistant Examiner* — Tito Q Pham
(74) *Attorney, Agent, or Firm* — Brinks Gilson & Lione

(57) ABSTRACT

Methods and apparatus for transmitting data is disclosed. Data to be transmitted is segmented into data packets. The segmented data packets are duplicated into multiple groups of data packets, which are then transmitted from a device at a transmitting end to a device at a receiving end using multiple transmission protocols in parallel. Each of a set of duplicated data packets is thus transmitted by one of the multiple transmission protocols. The data packet among each of set of duplicated data packets that is first received by the device at the receiving end is retained and other received data packets of the set of duplicated data packets are discarded. The disclosed methods and apparatus thus combine benefits of different transmission protocols. For example, the disclosed methods and apparatus help achieve both transmission integrity and timing.

17 Claims, 16 Drawing Sheets

(51) Int. Cl.
  *H04L 12/823* (2013.01)
  *H04L 1/00* (2006.01)

(56) References Cited

U.S. PATENT DOCUMENTS

| | | |
|---|---|---|
| 2007/0223533 A1 | 9/2007 | Kirrmann et al. |
| 2008/0137630 A1* | 6/2008 | Park .................. H04L 29/12283 370/338 |
| 2008/0184224 A1* | 7/2008 | Das ....................... G06F 9/5077 718/1 |
| 2011/0319072 A1* | 12/2011 | Ekici ..................... H04W 48/18 455/426.1 |
| 2014/0105033 A1* | 4/2014 | Vasseur ................... H04L 45/24 370/248 |
| 2014/0369355 A1* | 12/2014 | Hori ....................... H04L 69/14 370/392 |
| 2015/0256654 A1* | 9/2015 | Oguchi ................... H04L 69/08 709/230 |
| 2015/0372908 A1* | 12/2015 | Kashyap ................. H04L 45/74 370/392 |

FOREIGN PATENT DOCUMENTS

| | | |
|---|---|---|
| CN | 104283658 A | 1/2015 |
| CN | 104702371 A | 6/2015 |

OTHER PUBLICATIONS

Office Action dated Oct. 30, 2019 for Chinese Application No. 201510417301.9 with concise English Translation, 9 pages.

\* cited by examiner

DATA TRANSMISSION USING MULTIPLE CHANNELS WITH DISTINCT DATA TRANSMISSION PROTOCOLS

CROSS-REFERENCE TO RELATED APPLICATION

This application is a continuation application of PCT Application No. PCT/CN2016/086170 filed Jun. 17, 2016, which claims priority to Chinese Patent Application No. 201510417301.9, filed with Chinese Patent Office on Jul. 15, 2015, entitled: DATA TRANSMISSION METHOD, APPARATUS, AND SYSTEM", both of which are incorporated by reference in their entireties.

FIELD OF THE TECHNOLOGY

The present disclosure relates to the field of computers and communications technologies, and in particular, to a data transmission method, apparatus, and system.

BACKGROUND OF THE DISCLOSURE

Currently, a network transmission mode used in a communications device is generally configured such that a device at a transmitting end and a device at a receiving end communicate data by using a same transmission protocol. Common transmission protocols include the Transmission Control Protocol (TCP), the User Datagram Protocol (UDP), the Bluetooth Serial Port Profile (SPP), and the like. In a transmission process, if data is excessively large, a transmitting device may first segment the data into several data packets according to the transmission protocol, where a sequence number is assigned to each data packet and the device at the transmitting end transmits the data packets to the device at the receiving end sequentially.

A reliable transmission protocol such as the TCP has a retransmission mechanism for lost packets. If a data packet currently received by the device at the receiving end is not a correct data packet, the device at the receiving end instructs the device at the transmitting end to retransmit a correct data packet, and simultaneously continue to receive a next new data packet. For an unreliable transmission protocol such as the UDP, if a data packet currently received by the device at the receiving end is not a correct data packet, the device at the receiving end discards the data packet by default, and continues to receive a next new data packet. Therefore, the reliable transmission protocol is suitable for a service that has an integrity requirement on data, such as file transmission. The unreliable transmission protocol has a fast speed and high efficiency, and is suitable for a service that has a real-time requirement on data, such as streaming media.

However, both the reliable transmission protocol and the unreliable transmission protocol can only meet a part of the service requirements. As such, the existing data transmission modes cannot meet both integrity and real-time service requirements.

SUMMARY

In view of this, embodiments of the present invention provide a data transmission method, apparatus, and system, so as to meet integrity and real-time service requirements on data transmission between devices.

An embodiment of the present invention provides a data transmission method, used for transmitting data by a device at the transmitting end to a device at the receiving end, where the method includes: obtaining, by the device at the transmitting end, a group of data packets, the group of data packets including at least one data packet, and each data packet in the group of data packets having a corresponding sequence number; initializing, by the device at the transmitting end and the device at the receiving end, at least two transmission protocols, and establishing at least two transmission channels corresponding to the at least two transmission protocols, one transmission channel being corresponding to one transmission protocol; copying, by the device at the transmitting end, the group of data packets into multiple groups of data packets according to a quantity of the at least two transmission channels; transmitting, by the device at the transmitting end, the multiple groups of data packets obtained through the copying to the device at the receiving end simultaneously through the at least two transmission channels, one group of data packets being transmitted through one transmission channel; pre-receiving, by the device at the receiving end, the data packets transmitted through the at least two transmission channels; and receiving, by the device at the receiving end, for data packets with a same sequence number, data packets that are transmitted through the at least two transmission channels and that arrive first, and discarding, other data packets that have the same sequence number and that arrive later.

An embodiment of the present invention further provides a data transmission method, applicable to a device at the transmitting end, where the method includes: obtaining a group of data packets, the group of data packets including at least one data packet, and each data packet in the group of data packets having a corresponding sequence number; initializing at least two transmission protocols, and establishing, with a device at the receiving end, at least two transmission channels corresponding to the at least two transmission protocols, one transmission channel being corresponding to one transmission protocol; copying the group of data packets into multiple groups of data packets according to a quantity of the at least two transmission channels; and transmitting the multiple groups of data packets obtained through the copying to the device at the receiving end simultaneously through the at least two transmission channels, one group of data packets being transmitted through one transmission channel.

An embodiment of the present invention further provides a data transmission method, applicable to a device at the receiving end, where the method includes: initializing at least two transmission protocols and establishing, with a device at the transmitting end, at least two transmission channels corresponding to the at least two transmission protocols, one transmission channel being corresponding to one transmission protocol, the at least two transmission channels being all used for transmitting a same group of data packets, each data packet in the group of data packets having a corresponding sequence number, and the group of data packets being pre-copied into multiple groups, so that one transmission channel is used for transmitting one group of data packets; pre-receiving the data packets transmitted by the device at the transmitting end through the at least two transmission channels; and receiving, for data packets with a same sequence number, data packets that are transmitted through the at least two transmission channels and that arrive first, and discarding, other data packets that have the same sequence number and that arrive later.

An embodiment of the present invention provides a data transmission apparatus, running in a device at the transmitting end, where the apparatus includes: an obtaining module, configured to obtain a group of data packets, the group of data packets including at least one data packet, and each data packet in the group of data packets having a corresponding sequence number; a multi-protocol channel establishment module, configured to initialize at least two transmission protocols, and establish, with a device at the receiving end, at least two transmission channels corresponding to the at least two transmission protocols, one transmission channel being corresponding to one transmission protocol; a copy module, configured to copy the group of data packets into multiple groups of data packets according to a quantity of the at least two transmission channels; and a transmission module, configured to transmit the multiple groups of data packets obtained through the copying to the device at the receiving end simultaneously through the at least two transmission channels, one group of data packets being transmitted through one transmission channel.

An embodiment of the present invention further provides a data transmission apparatus, running in a device at the receiving end, where the apparatus includes: a multi-protocol channel establishment module, configured to initialize at least two transmission protocols and establish, with a device at the transmitting end, at least two transmission channels corresponding to the at least two transmission protocols, one transmission channel being corresponding to one transmission protocol, the at least two transmission channels being all used for transmitting a same group of data packets, each data packet in the group of data packets having a corresponding sequence number, and the group of data packets being pre-copied into multiple groups, so that one transmission channel is used for transmitting one group of data packets; a data pre-receiving module, configured to pre-receive the data packets transmitted by the device at the transmitting end through the at least two transmission channels; and a data receiving module, configured to receive, for data packets with a same sequence number, data packets that are transmitted through the at least two transmission channels and that arrive first, and discard, other data packets that have the same sequence number and that arrive later.

An embodiment of the present invention provides a data transmission system, including a device at the transmitting end and a device at the receiving end, where the device at the transmitting end includes the foregoing data transmission apparatus running in the device at the transmitting end, and the device at the receiving end includes the foregoing data transmission apparatus running in the device at the receiving end.

An embodiment of the present invention provides a nonvolatile computer readable storage medium, where the medium stores a program, and the program can cause a computer to execute the foregoing data transmission method applicable to a device at the transmitting end.

An embodiment of the present invention provides a nonvolatile computer readable storage medium, where the medium stores a program, and the program can cause a computer to execute the foregoing data transmission method applicable to a device at the receiving end.

By means of the data transmission method, apparatus, and system provided in the embodiments of the present invention, a same group of data packets may be transmitted simultaneously through transmission channels corresponding to multiple transmission protocols, and the multiple protocols may be but not limited to a combination of reliable and unreliable transmission protocols, and may simultaneously meet integrity and real-time service requirements of data transmission.

To make the foregoing and other objectives, features, and advantages of the present disclosure more comprehensible, preferred embodiments are described in detail below with reference to the accompanying drawings.

DESCRIPTION OF EMBODIMENTS

To further explain the technical means used in the present disclosure for achieving the intended objectives and the effects thereof, specific implementation manners, structures, features, and effects of the present disclosure are described in detail below with reference to the accompanying drawings and preferred embodiments.

Figure 1:
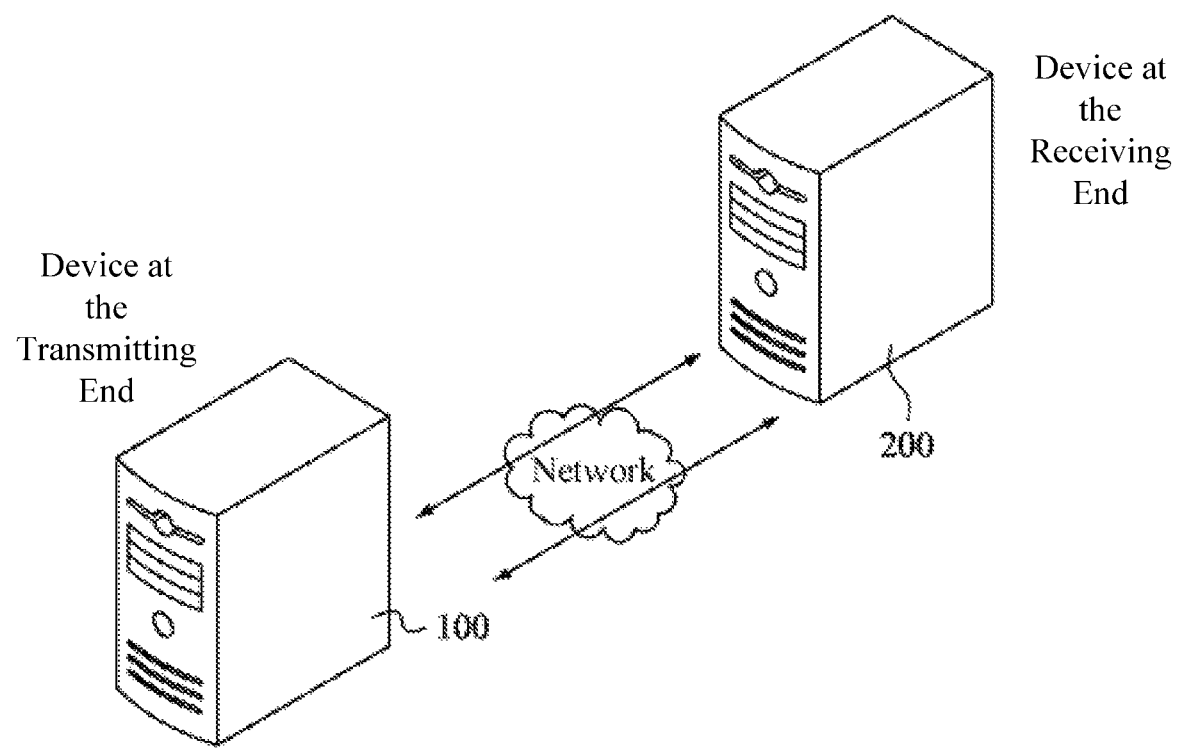
FIG. 1 shows an example data communication system.

Referring to FIG. 1, FIG. 1 is a diagram of an application environment of a data transmission method, apparatus, and system provided in the embodiments of the present invention. As shown in FIG. 1, a device at the transmitting end 100 and a device at the receiving end 200 are located in a wired or wireless network, and perform data transmission through the wired or wireless network, to implement the data transmission method provided in the following embodiments. The device at the transmitting end 100 and the device at the receiving end 200 may be but are not limited to a server or a terminal device. The server refers to, for example, a computer deployed in a network environment for providing various functionalities and data needed for a service to one or more terminal devices, and the terminal device refers to, for example, a desktop computer, a notebook computer, a smartphone, a personal digital assistant, a tablet computer, or the like.

Figure 2:
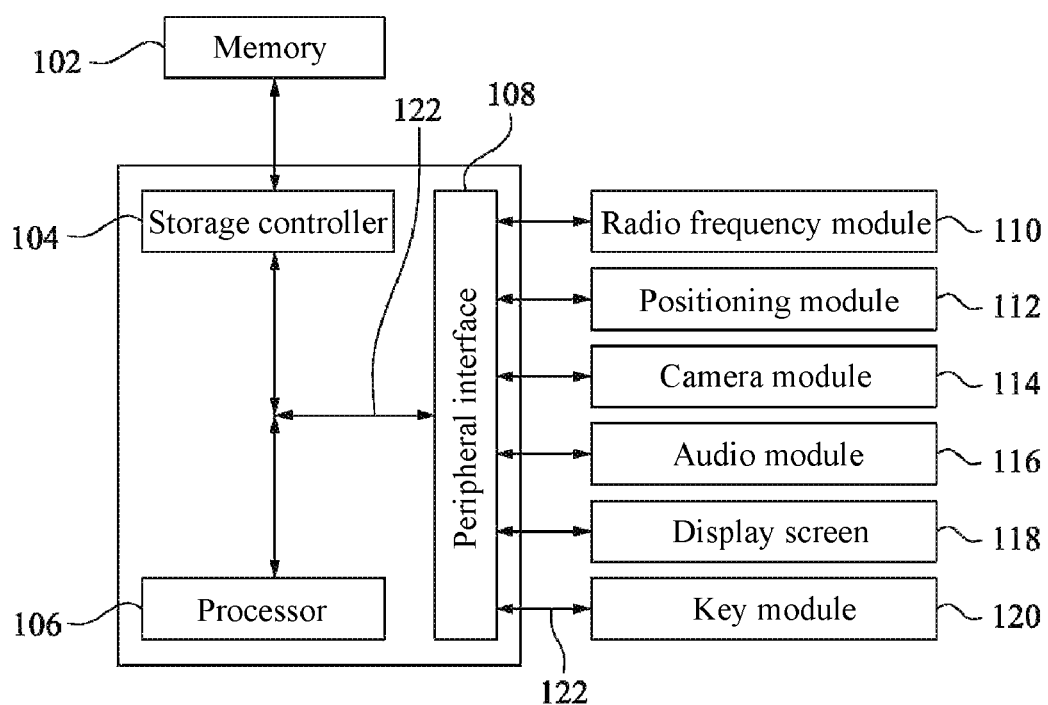
FIG. 2 shows a block diagram of a terminal device.

Referring to FIG. 2, FIG. 2 shows a block diagram of an embodiment of a terminal device. The terminal device may be the device at the transmitting end 100 or the device at the receiving end 200. As shown in FIG. 2, the terminal device includes a memory 102, a storage controller 104, one or more processors 106 (only one processor is shown in FIG. 2), a peripheral interface 108, a radio frequency module 110, a positioning module 112, a camera module 114, an audio module 116, a display module 118, and a keyboard module 120. These components communicate with each other through one or more communication buses/signal lines 122.

It may be understood that the structure shown in FIG. 2 is only for the purpose of illustration, and the terminal device may also include more or fewer components than those shown in FIG. 2, or have a configuration different from that shown in FIG. 2. The components shown in FIG. 2 may be implemented by using hardware, software, or a combination thereof.

The memory 102 may be configured to store a software program and module, for example, program instructions/modules corresponding to a data transmission method, apparatus, and system in the embodiments of the present invention. The processor 106 runs the software program and module stored in the memory 102, to implement various functions and data processing for applications, for example, to implement the data transmission method in the embodiments of the present invention.

The memory 102 may include a high-speed random access memory, and may also include a nonvolatile memory, for example, one or more magnetic storage devices, flash memories or other nonvolatile solid-state memories. In some embodiments, the memory 102 may further include memories remotely disposed relative to the processor 106, and these remote memories may be connected to the terminal device through a network. Examples of the network include, but are not limited to, the Internet, an intranet, a local area network, a mobile communications network, or a combination thereof. The processor 106 and other components may access the memory 102 under the control of the memory controller 104.

The peripheral interface 108 couples various input/output devices to the processor 106 and the memory 102. The processor 106 runs various software and instructions stored in the memory 102, so as to perform various functions of the terminal device and to perform data processing.

In some embodiments, the peripheral interface 108, the processor 106, and the memory controller 104 may be implemented in a single chip. In some other embodiments, they may be separately implemented by independent chips.

The radio frequency module 110 is configured to receive and send an electromagnetic wave, and implement mutual conversion between the electromagnetic wave and an electric signal, such that the terminal device can communicate with the communications network or another device. The radio frequency module 110 may include various circuit elements for performing these functions, such as an antenna, a radio frequency transceiver, a digital signal processor, a cipher/decipher chip, a subscriber identity module (SIM) card, and a memory. The radio frequency module 110 may communicate with various networks such as the Internet, an intranet and a wireless network, or communicate with other devices through a wired or wireless network. The wireless network may include a cellular telephone network, a wireless local area network, or a metropolitan area network. The wireless network may comply with various communications standards, protocols and technologies, which include, but are not limited to, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (Wi-Fi) (for example, US Institute of Electrical and Electronic Engineers IEEE 802.11a, IEEE 802.11b, IEEE802.11g and/or IEEE 802.11n), Voice over Internet Protocol (VoIP), Worldwide Interoperability for Microwave Access (Wi-Max), other protocols for email, instant messaging and short message service, and any other suitable communications protocols, and other communications protocols being developed or to be developed.

The positioning module 112 is configured to acquire a current location of the terminal device. Examples of the positioning module 112 include, but are not limited to, a positioning module based on Global Positioning System (GPS) and a positioning module based on a wireless local area network or mobile communications network location technologies.

The camera module 114 is configured to capture a picture or video. The captured picture or video may be stored in the memory 102, and may be sent by using the radio frequency module 110.

The audio module 116 provides an audio interface for a user, and may include one or more microphones, one or more loudspeakers, and an audio circuit. The audio circuit receives audio data from the peripheral interface 108, converts the audio data into electric information, and transmits the electric information to the loudspeaker. The loudspeaker converts the electric information into an acoustic wave audible to the human ear. The audio circuit further receives electric information from the microphone, converts the electric information into audio data, and transmits the audio data to the peripheral interface 108 for further processing. The audio data may be acquired from the memory 102 or by the radio frequency module 110. In addition, the audio data may also be stored in the memory 102 or sent by the radio frequency module 110. In some embodiments, the audio module 116 may further include an earphone jack, for providing an audio interface for an earphone or another device.

The display screen 118 provides an output interface between the terminal device and the user. Specifically, the display screen 118 displays a video output to the user, and content of the video output may include texts, images, videos, or any combination thereof. Some output results correspond to some user interface objects. Further, the display screen 118 may further provide an input interface between the terminal device and the user for receiving an input of the user, such as tapping, sliding, or other gesture operations of the user, so that the user interface object responds to the input of the user. The technology for detecting the input of the user may be a resistive touch detection technology, a capacitive touch detection technology, or any other possible touch detection technologies. These touch technologies may be implemented as a touch panel disposed over the display screen. Specific examples of the display screen 118 include but are not limited to a liquid crystal display and a display based on light-emitting diodes in active matrix.

The key module 120 also provides an interface for the user to input information to the terminal device, and the user may press different keys to enable the terminal device to perform different functions.

Figure 3:
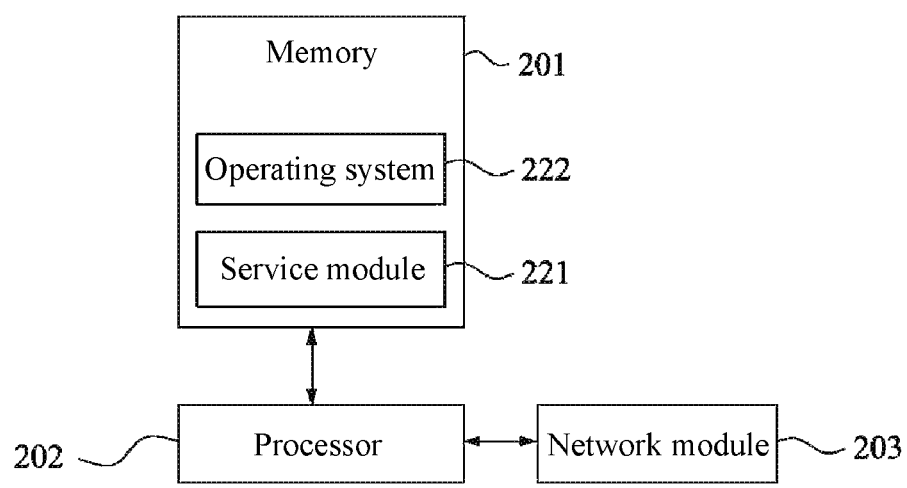
FIG. 3 shows a block diagram of a server.

FIG. 3 shows a structural block diagram of an embodiment of a server. The server is also applicable to either a device at the transmitting end 100 or a device at the receiving end 200 of FIG. 1. As shown in FIG. 3, the server includes: a memory 201, a processor 202, and a network module 203.

It may be understood that the structure shown in FIG. 3 is only for the purpose of illustration, and the server may also include more or fewer components than those shown in FIG. 3, or have a configuration different from that shown in FIG. 3. The components shown in FIG. 3 may be implemented by using hardware, software, or a combination thereof. In addition, the server in this embodiment of the present invention may further include multiple servers having different functions. These servers may be centralized or distributed.

The memory 201 may be configured to store a software program and module, for example, program instructions/modules corresponding to a data transmission method, apparatus, and system in the embodiments of the present invention. The processor 202 runs the software program and module stored in the memory 201, to implement various functions and data processing for applications, for example, to implement the data transmission method in the embodiments of the present invention. The memory 201 may include a high-speed random access memory, and may also include a nonvolatile memory, for example, one or more magnetic storage devices, flash memories or other nonvolatile solid-state memories. In some embodiments, the memory 201 may further include memories remotely disposed relative to the processor 202, and these remote memories may be connected to the server through a network. Further, the foregoing software program and module may further include: a service module 221 and an operating system 222. The operating system 222, for example, may be LINUX, UNIX, or WINDOWS, may include various software component and/or drivers configured to manage system tasks (such as memory management, storage device control, power management), and may communicate with various hardware or software components, so as to provide a running environment for other software components. The service module 221 runs based on the operating system 222, listens to a request from a network by using a network service of the operating system 222, completes corresponding data processing according to the request, and returns a processing result to a client. That is, the service module 221 is configured to provide a network service for the client.

The network module 203 is configured to receive and send a network signal. The network signal may include a wireless signal or a wired signal. In an example, the network signal may be a wired network signal. In this case, the network module 203 may include an element such as a processor, a random access memory, a converter, and a crystal oscillator.

The following describes the data transmission method, apparatus, and system provided in the present disclosure with reference to specific embodiments.

Figure 4:
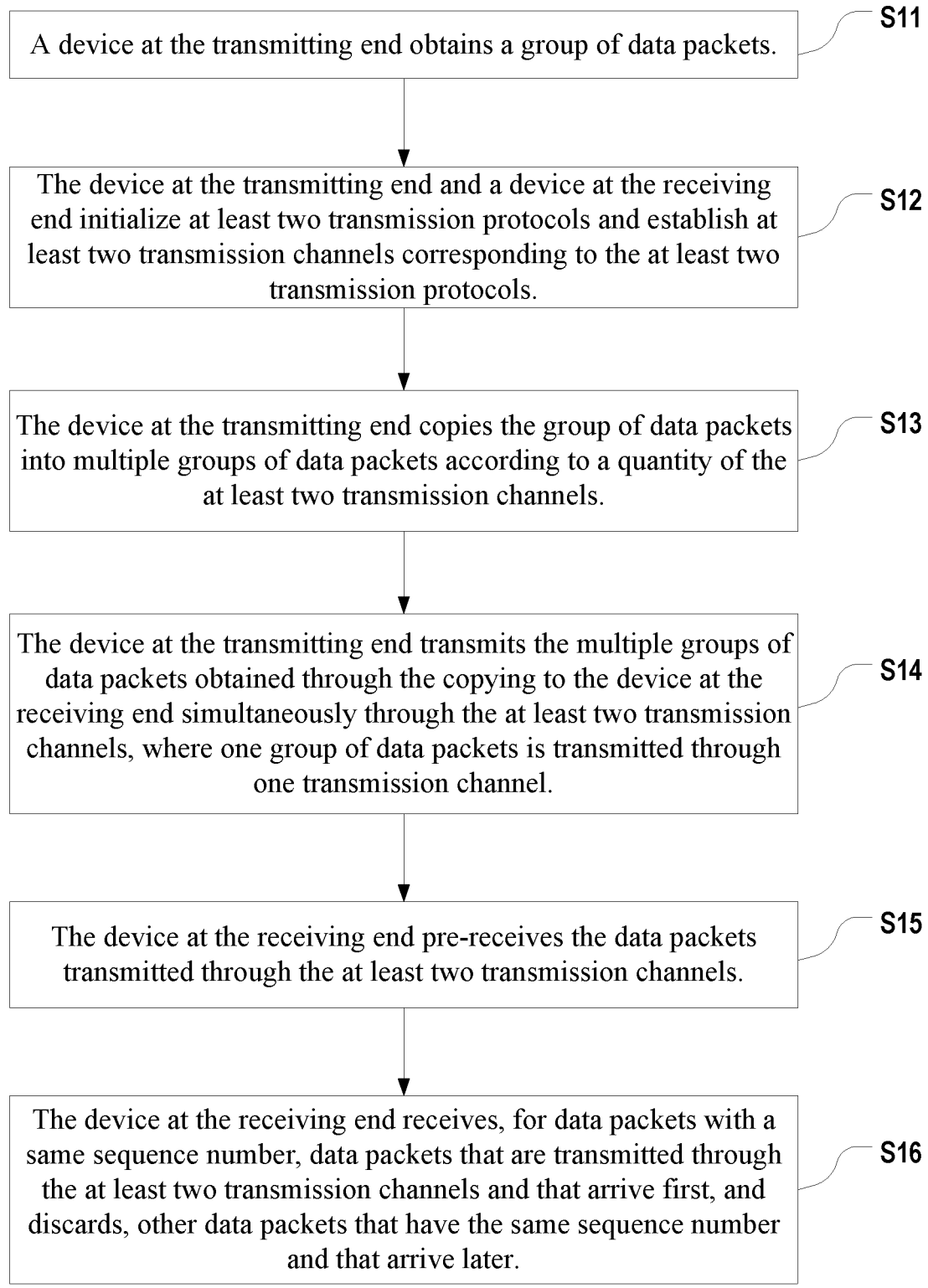
FIG. 4 is a flowchart of a data transmission method.

An embodiment of the present invention provides a data transmission method. The method may be implemented in the application environment shown in FIG. 1, and is used for transmitting data by a device at the transmitting end to a device at the receiving end. FIG. 4 shows a flowchart of this method. Referring to FIG. 4, the method of this embodiment includes the following steps:

Step S11. The device at the transmitting end obtains a group of data packets.

In this step, the device at the transmitting end obtains a group of data packets to be transmitted to the device at the receiving end. The group of data packets includes at least one data packet, and each data packet contain s suitable amount of data that does not need to be further segmented according to a transmission protocol. Each data packet in the group of data packets has a corresponding sequence number. In an example, the sequence number of the data packet in the group of data packets may be assigned by the device at the transmitting end. For example, the device at the transmitting end may assign sequence numbers to all data packets in the group of data packets sequentially, and a sequence number of each data packet in the group of data packets is different from a sequence number of another data packet.

Step S12. The device at the transmitting end and the device at the receiving end initialize at least two transmission protocols and establish at least two transmission channels corresponding to the at least two transmission protocols.

Both the device at the transmitting end and the device at the receiving end may include multiple transmission protocols, and both the device at the transmitting end and the device at the receiving end share at least two same transmission protocols. The transmission protocols may be but not limited to protocols such as the TCP, the UDP, and the Bluetooth SPP.

In this step, when the device at the transmitting end prepares to send the group of data packets to the device at the receiving end, the device at the transmitting end and the device at the receiving end initialize at least two transmission protocols and establish at least two transmission channels corresponding to the at least two transmission protocols, where one transmission channel corresponds to one transmission protocol. For example, assuming that the device at the transmitting end includes the three transmission protocols: the TCP, the UDP, and the Bluetooth SPP, and the device at the receiving end also has the three transmission protocols: the TCP, the UDP, and the Bluetooth SPP, the device at the transmitting end and the device at the receiving end may select, according to actual situations, any two transmission protocols of the three transmission protocols: the TCP, the UDP, and the Bluetooth SPP to transmit data, and establish two transmission channels; or transmit data by using the three transmission protocols: the TCP, the UDP, and the Bluetooth SPP, and establish three transmission channels. When both the device at the transmitting end and the device at the receiving end have a larger quantity of transmission protocols, more than three transmission protocols may be used for transmitting data. In this case, more transmission channels need to be established.

Step S13. The device at the transmitting end copies the group of data packets into multiple groups of data packets according to a quantity of the at least two transmission channels.

In this step, the device at the transmitting end copies the group of data packets, and a quantity of all groups of data packets obtained through the copying is equal to a quantity of established transmission channels, so that one group of data packets may be transmitted through one transmission channel. Because other groups of data packets are copied from the group of data packets, sequence numbers of same data packets are the same in the each group of data packets obtained through the copying.

Step S14. The device at the transmitting end transmits the multiple groups of data packets obtained through the copying to the device at the receiving end simultaneously through the at least two transmission channels, where one group of data packets is transmitted through one transmission channel.

In this step, the device at the transmitting end transmits the multiple groups of data packets obtained through the copying to the device at the receiving end through the at least two transmission channels, that is, it transmits, in a multi-protocol simultaneous transmission manner, the group of data packets obtained at the device at the transmitting end previously. For example, if the device at the transmitting end and the device at the receiving end have established two transmission channels: a first transmission channel (for example, established according to the TCP) and a second transmission channel (for example, established according to the UDP), a quantity of the multiple groups of data packets is two. The first transmission channel is used for transmitting one group of data packets, and the second transmission channel is used for transmitting the other group of data packets.

Further, the length of each data packet in the group of data packets is not greater than the length of a data packet the smallest of maximum allowable data packet lengths among the at least two transmission protocols. Still using the foregoing example for description, if the maximum length of a data packet that is allowed to be transmitted by a first transmission protocol corresponding to the first transmission channel and that does not need to be segmented is 1480 bytes, and the maximum length of a data packet that is allowed to be transmitted by a second transmission protocol corresponding to the second transmission channel and that does not need to be segmented is 1472 bytes, the length of the data packet that is allowed to be transmitted by the second transmission protocol and that does not need to be segmented is the minimum, so that the length of each data packet in the group of data packets should be not greater than the maximum length of the data packet that is allowed to be transmitted by the second transmission protocol. For this example, no packet is allowed to be longer than 1472 bytes.

Step S15. The device at the receiving end pre-receives the data packets transmitted through the at least two transmission channels.

In this step, when a data packet in each transmission channel arrives at the device at the receiving end, the device at the receiving end pre-receives the data packet.

Step S16. The device at the receiving end receives, for data packets with a same sequence number, data packets that are transmitted through the at least two transmission channels and that arrive first, and discards, other data packets that have the same sequence number and that arrive later.

Figure 5:
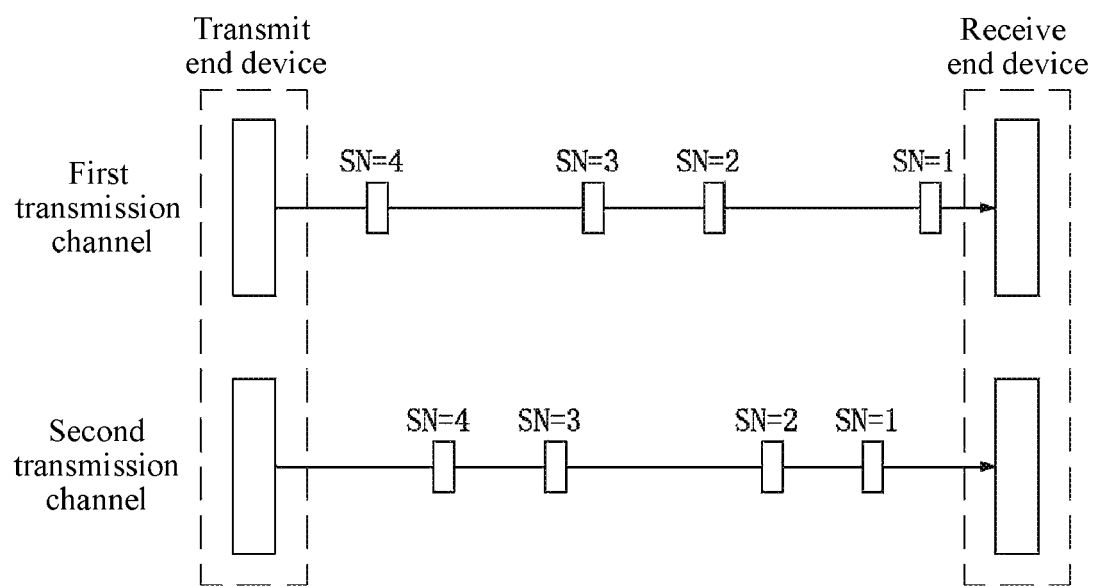
FIG. 5 is a schematic diagram of a data transmission process of a data transmission method.
Figure 6:
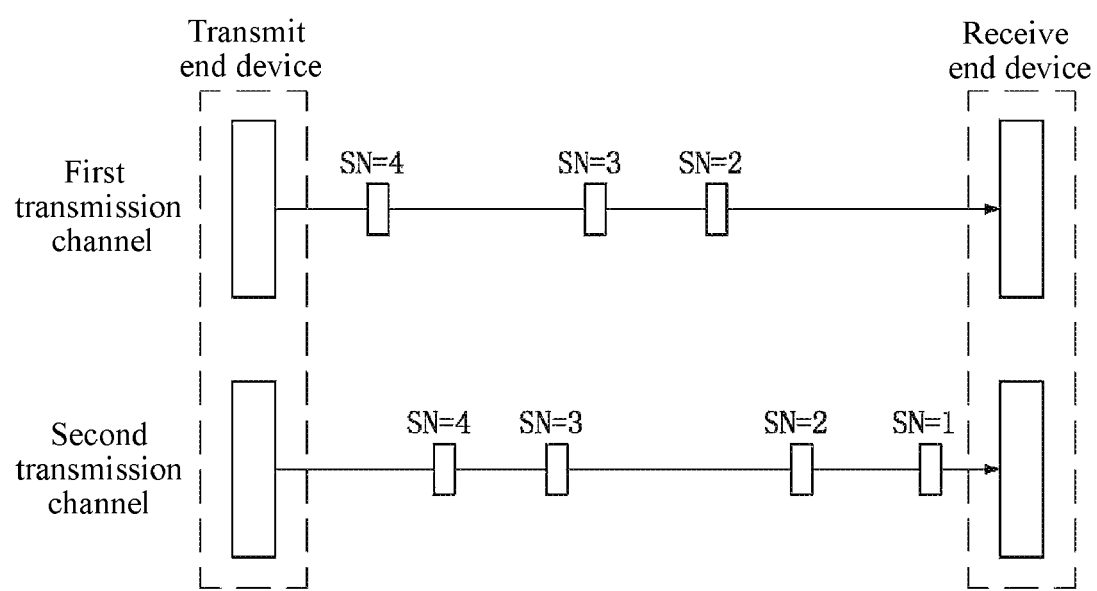
FIG. 6 is another schematic diagram of a data transmission process of a data transmission method.

In this step, the device at the receiving end receives, for data packets with a same sequence number, data packets that are transmitted through the at least two transmission channels and that arrive first, and discards, other data packets that have the same sequence number and that arrive later. That is, the receiving principle of "receive the first, discard the later" is used. Still using the foregoing example for description, as shown in FIG. 5 and FIG. 6, the device at the transmitting end and the device at the receiving end use the first transmission channel and the second transmission channel to simultaneously transmit the same two groups of data packets obtained through the copying. Assuming that each group of data packets includes four data packets, sequence numbers (SN) of the four data packets are separately 1, 2, 3, and 4. In FIG. 5, a data packet whose SN=1 and that is transmitted by the first transmission channel arrives at the device at the receiving end first, and the device at the receiving end receives the data packet whose SN=1 and that is transmitted by the first transmission channel. After the data packet transmitted by the first transmission channel and whose SN=1 has been received by the device at the receiving end, in FIG. 6, a data packet whose SN=1 and that is transmitted by the second transmission channel arrives at the device at the receiving end later, and the device at the receiving end discards the data packet whose SN=1 and that is transmitted by the second transmission channel. The rest may be deduced by analogy. When the device at the transmitting end and the device at the receiving end use more than three transmission channels to simultaneously transmit a same group of data packets, for data packets that have a same sequence number, the device at the receiving end receives a data packet that arrives first, and discards other data packets that have the same sequence number but arrive later.

Therefore, it may be seen that, by means of the data transmission method provided in this embodiment, a same group of data packets are transmitted simultaneously through transmission channels corresponding to multiple transmission protocols, and the multiple protocols may be but not limited to a combination of reliable and unreliable transmission protocols, and may simultaneously meet integrity and real-time service requirements of data transmission.

Figure 7:
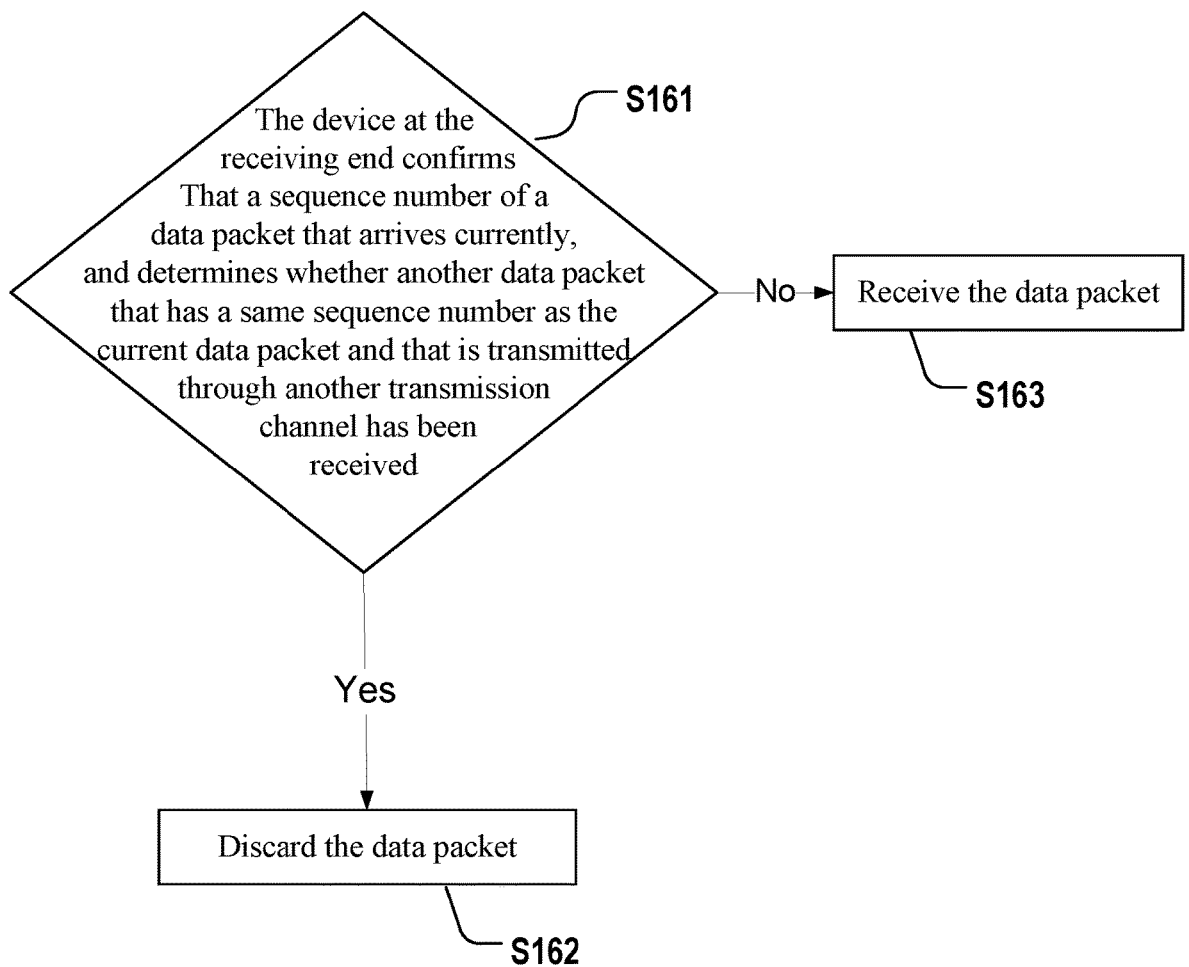
FIG. 7 is a flowchart of the step S16 in FIG. 4.

Referring to FIG. 7, FIG. 7 is a schematic flowchart of main substeps of step S16 of FIG. 4. Step S16 includes the following substeps:

Step S161. The device at the receiving end determines, when a data packet in each transmission channel arrives at the device at the receiving end, and after pre-receiving the data packet, whether another data packet that has a same sequence number as the data packet and that is transmitted through another transmission channel has been received.

In this step, after pre-receiving each data packet transmitted through each transmission channel, the device at the receiving end confirms that a sequence number of a data packet that arrives currently, and determines whether another data packet that has a same sequence number as the current data packet and that is transmitted through another transmission channel has been received; if determining that the another data packet has been received, performs step S162; and if determining that the another data packet has not been received, performs step S163.

Step S162. Discard the data packet.

In this step, if determining that the other data packet that has the same sequence number as the current data packet and that is transmitted through the other transmission channel has been received, the device at the receiving end discards the data packet that arrives currently.

Step S163. Receive the data packet.

In this step, if determining that the other data packet that has the same sequence number as the current data packet and that is transmitted through the other transmission channel has not been received, the device at the receiving end receives the data packet.

Figure 8:
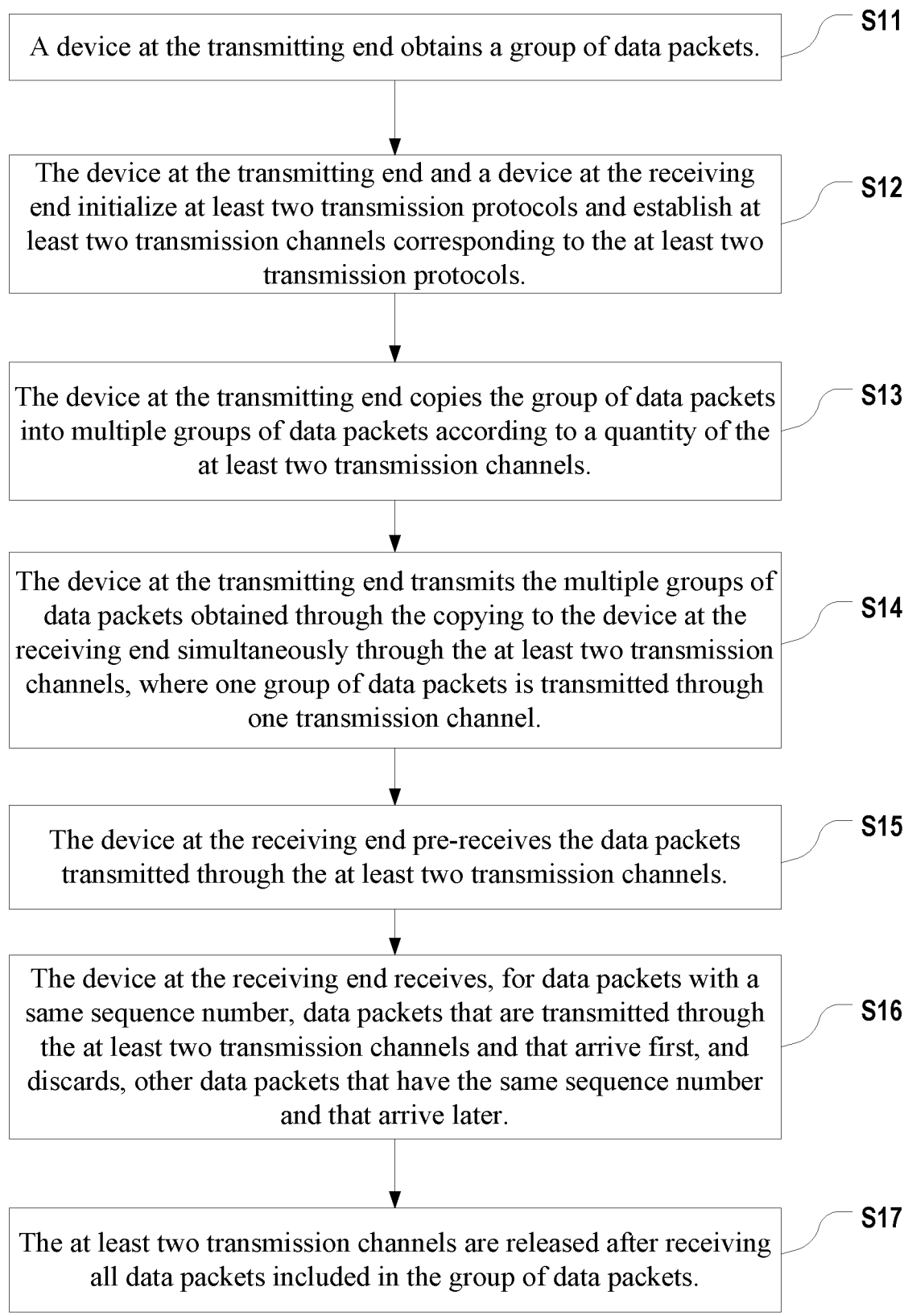
FIG. 8 is a flowchart of another data transmission method.

Another embodiment of the present invention provides a data transmission method. FIG. 8 shows a flowchart of this method. Referring to FIG. 8, the method of this embodiment includes the following steps:

Step S11. A device at the transmitting end obtains a group of data packets.

Step S12. The device at the transmitting end and a device at the receiving end initialize at least two transmission protocols and establish at least two transmission channels corresponding to the at least two transmission protocols.

Step S13. The device at the transmitting end copies the group of data packets into multiple groups of data packets according to a quantity of the at least two transmission channels.

Step S14. The device at the transmitting end transmits the multiple groups of data packets obtained through the copying to the device at the receiving end simultaneously through the at least two transmission channels, one group of data packets being transmitted through one transmission channel.

Step S15. The device at the receiving end pre-receives the data packets transmitted through the at least two transmission channels.

Step S16. The device at the receiving end receives, for data packets with a same sequence number, data packets that are transmitted through the at least two transmission channels and that arrive first, and discards, other data packets that have the same sequence number and that arrive later.

For the foregoing step S11 to step S16, reference may be made to the embodiment shown in FIGS. 4-7. Details are not described herein again.

Step S17. The at least two transmission channels are released after receiving all data packets included in the group of data packets.

In this step, the device at the transmitting end and the device at the receiving end release the at least two transmission channels after completing transmission of the group of data packets. For example, the device at the receiving end releases the at least two transmission channels after receiving all data packets included in the group of data packets. Further, the device at the receiving end further sends information that all the data packets included in the group of data packets have been received to the device at the transmitting end, and when receiving the information that all the data packets included in the group of data packets have been received from the device at the receiving end, the device at the transmitting end releases the at least two transmission channels. In this embodiment of the present invention, the device at the transmitting end may also send, to the device at the receiving end, information for releasing the at least two transmission channels after completely sending all the data packets included in the group of data packets. The device at the receiving end sends, to the device at the transmitting end, confirmation information for releasing the at least two transmission channels after receiving all the data packets included in the group of data packets, and the device at the transmitting end releases the at least two transmission channels after receiving the confirmation information. The at least two transmission channels may be released according to a release procedure of the respective corresponding transmission protocols or actual requirements, and are not limited to the several manners in the foregoing examples.

In this embodiment of the present invention, after all data packets included in the group of data packets in each transmission channel arrive at the device at the receiving end, the at least two transmission channels may be released simultaneously or separately; or after receiving all the data packets included in the group of data packets, the device at the receiving end releases all transmission channels of the at least two transmission channels no matter whether transmission of all the data packets has not been completed in a transmission channel.

Figure 9:
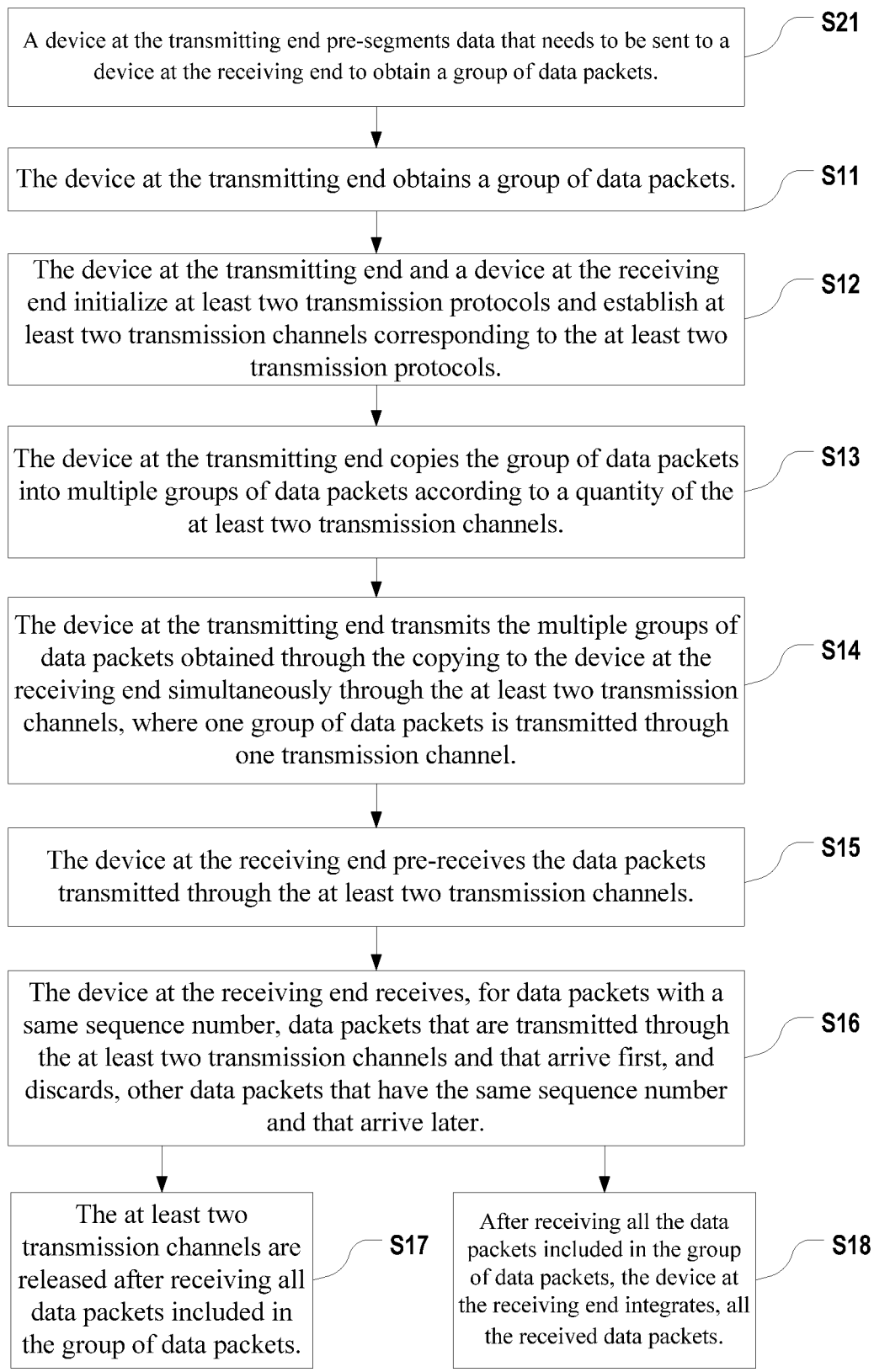
FIG. 9 is a flowchart of another data transmission method.

Another embodiment of the present invention provides a data transmission method. FIG. 9 shows a flowchart of this method. Referring to FIG. 9, the method of this embodiment includes the following steps:

Step S21. A device at the transmitting end pre-segments data that needs to be sent to a device at the receiving end to obtain a group of data packets.

A segmentation standard is to meet that the length of each data packet in the group of data packets is not greater than the length of a data packet whose length is the smallest of the maximum allowed data packet lengths among the at least two transmission protocols, and both the device at the transmitting end and the device at the receiving end include the at least two transmission protocols, and simultaneously transmit the group of data packets through the at least two transmission protocols.

Step S11. The device at the transmitting end obtains the group of data packets.

Step S12. The device at the transmitting end and the device at the receiving end initialize at least two transmission protocols and establish at least two transmission channels corresponding to the at least two transmission protocols.

Step S13. The device at the transmitting end copies the group of data packets into multiple groups of data packets according to a quantity of the at least two transmission channels.

Step S14. The device at the transmitting end transmits the multiple groups of data packets obtained through the copying to the device at the receiving end simultaneously through the at least two transmission channels, where one group of data packets is transmitted through one transmission channel.

Step S15. The device at the receiving end pre-receives the data packets transmitted through the at least two transmission channels.

Step S16. The device at the receiving end receives, for data packets with a same sequence number, data packets that are transmitted through the at least two transmission channels and that arrive first, and discards, other data packets that have the same sequence number and that arrive later.

Step S17. The device at the receiving end releases the at least two transmission channels after receiving all data packets included in the group of data packets.

For the foregoing step S11 to step S16, reference may be made to the embodiment shown in FIGS. 4-7. For step S17, reference may be made to the embodiment shown in FIG. 8. Details are not described herein again.

Step S18. After receiving all the data packets included in the group of data packets, the device at the receiving end integrates, all the received data packets.

In this step, after receiving all the data packets included in the group of data packets, the device at the receiving end integrates all the received data packets, to integrate all the received data packets into a group of data packets or recover all the received data packets to data before being segmented by the device at the transmitting end.

Figure 10:
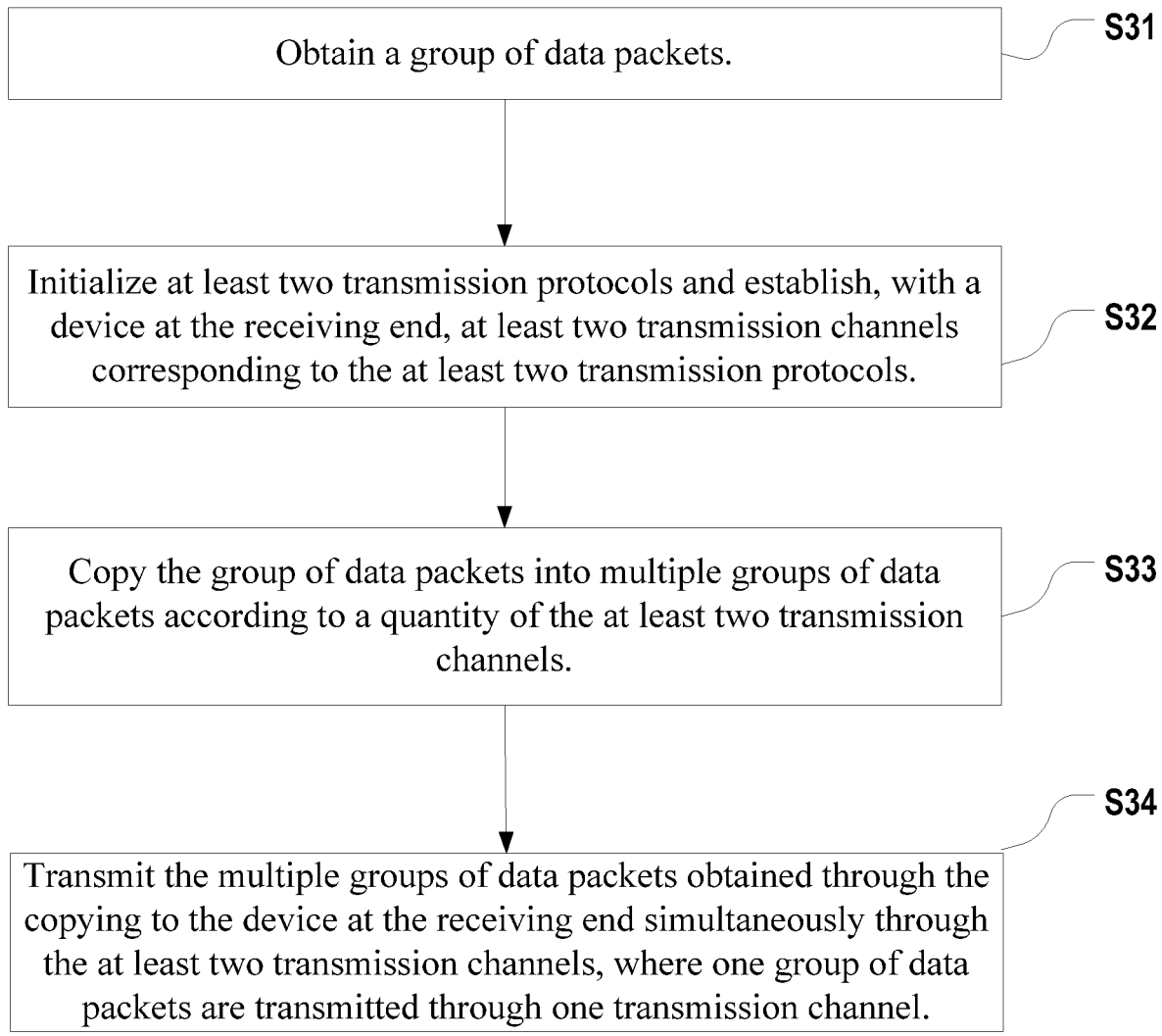
FIG. 10 is a flowchart of another data transmission method.

Another embodiment of the present invention provides a data transmission method. The method is applicable to a device at the transmitting end. FIG. 10 shows a flowchart of this method. Referring to FIG. 10, the method of this embodiment includes the following steps:

Step S31. Obtain a group of data packets.

In this step, the device at the transmitting end obtains a group of data packets to be transmitted to a device at the receiving end. The group of data packets includes at least one data packet. Each data packet is small data that does not need to be segmented according to a transmission protocol. Each data packet in the group of data packets has a corresponding sequence number. In an example, the sequence number of the data packet in the group of data packets may be assigned by the device at the transmitting end. For example, the device at the transmitting end assigns sequence numbers to all data packets in the group of data packets sequentially, and a sequence number of each data packet in the group of data packets is different from a sequence number of another data packet.

In other embodiments, if the device at the transmitting end needs to transmit big data (relative to the foregoing small data) to the device at the receiving end, the device at the transmitting end pre-segments the big data to obtain the group of data packets. A segmentation standard is to meet that the length of each data packet in the group of data packets is not greater than the length of a data packet whose length is the smallest of maximum allowed data packet lengths among the at least two transmission protocols and that do not need to be segmented, and both the device at the transmitting end and the device at the receiving end include the at least two transmission protocols, and simultaneously transmit the group of data packets through the at least two transmission protocols.

Step S32. Initialize at least two transmission protocols and establish, with a device at the receiving end, at least two transmission channels corresponding to the at least two transmission protocols.

In this step, when the device at the transmitting end prepares to send the group of data packets to the device at the receiving end, the device at the transmitting end initializes at least two transmission protocols and establishes, with the device at the receiving end, at least two transmission channels corresponding to the at least two transmission protocols, where one transmission channel corresponds to one transmission protocol. For example, assuming that the device at the transmitting end includes the three transmission protocols: the TCP, the UDP, and the Bluetooth SPP, and correspondingly, the device at the receiving end also has the three transmission protocols: the TCP, the UDP, and the Bluetooth SPP. The device at the transmitting end and the device at the receiving end may select, according to actual situations, any two transmission protocols of the three transmission protocols: two of the TCP, the UDP, and the Bluetooth SPP to transmit data, and establish two transmission channels; or transmit data by using the three transmission protocols: the TCP, the UDP, and the Bluetooth SPP, and establish three transmission channels. When both the device at the transmitting end and the device at the receiving end support a larger quantity of transmission protocols, more than three transmission protocols may be used for transmitting data. In this case, more transmission channels may be established.

Step S33. Copy the group of data packets into multiple groups of data packets according to a quantity of the at least two transmission channels.

In this step, the device at the transmitting end copies the group of data packets, and a quantity of all groups of data packets obtained through the copying is equal to a quantity of established transmission channels, so that one group of data packets may be transmitted through one transmission channel. Because other groups of data packets are copied from the group of data packets, sequence numbers of same data packets are the same in the each group of data packets obtained through the copying.

Step S34. Transmit the multiple groups of data packets obtained through the copying to the device at the receiving end simultaneously through the at least two transmission channels, where one group of data packets are transmitted through one transmission channel.

In this step, the device at the transmitting end transmits the multiple groups of data packets obtained through the copying to the device at the receiving end through the at least two transmission channels, that is, transmits, in a multi-protocol simultaneous transmission manner, the group of data packets obtained previously. For example, if the device at the transmitting end and the device at the receiving end have established two transmission channels: a first transmission channel (for example, established according to the TCP) and a second transmission channel (for example, established according to the UDP), a quantity of the multiple groups of data packets is two, the first transmission channel is used for transmitting one group of data packets, and the second transmission channel is used for transmitting the other group of data packets.

Further, the length of each data packet in the group of data packets is not greater than the length of a data packet whose length is the smallest of the maximum allowed data packet length among the at least two transmission protocols. Still using the foregoing example for description, if the maximum length of a data packet that is allowed to be transmitted by a first transmission protocol corresponding to the first transmission channel and that does not need to be segmented is 1480 bytes, and the maximum length of a data packet that is allowed to be transmitted by a second transmission protocol corresponding to the second transmission channel and that does not need to be segmented is 1472 bytes, the length of the data packet that is allowed to be transmitted by the second transmission protocol and that does not need to be segmented is the minimum, so that the length of each data packet in the group of data packets should be not greater than the maximum length of the data packet that is allowed to be transmitted by the second transmission protocol. In this example, no data packet is allowed to be longer than 1472 bytes.

Figure 11:
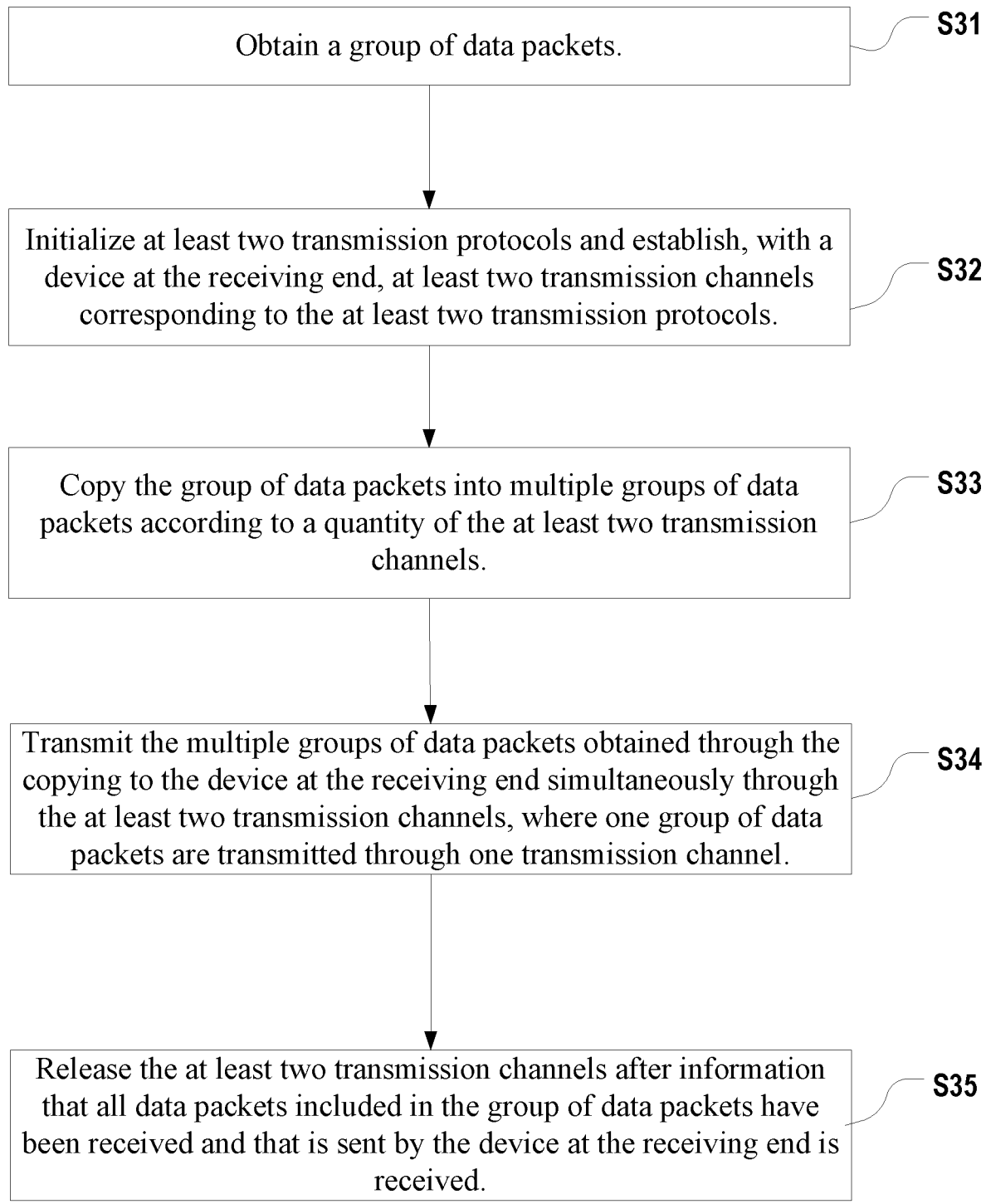
FIG. 11 is a flowchart of another data transmission method.

An embodiment of the present invention provides a data transmission method. FIG. 11 shows a flowchart of this method. Referring to FIG. 11, the method of this embodiment includes the following steps:

Step S31. Obtain a group of data packets.

Step S32. Initialize at least two transmission protocols and establish, with a device at the receiving end, at least two transmission channels corresponding to the at least two transmission protocols.

Step S33. Copy the group of data packets into multiple groups of data packets according to a quantity of the at least two transmission channels.

Step S34. Transmit the multiple groups of data packets obtained through the copying to the device at the receiving end simultaneously through the at least two transmission channels, where one group of data packets are transmitted through one transmission channel.

For the foregoing step S31 to step S34, reference may be to the embodiment shown in FIG. 10. Details are not described herein again.

Step S35. Release the at least two transmission channels after information that all data packets included in the group of data packets have been received and that is sent by the device at the receiving end is received.

In this step, after receiving the information that all the data packets included in the group of data packets have been received from the device at the receiving end, the device at the transmitting end releases the at least two transmission channels. After receiving the information that all the data packets included in the group of data packets have been received from the device at the receiving end, the device at the transmitting end may simultaneously or separately release the at least two transmission channels after all the data packets in a group of data packets in each transmission channel arrive at the device at the receiving end; or after receiving all data packets included in the group of data packets, the device at the receiving end releases all transmission channels of the at least two transmission channels no matter whether transmission of all the data packets has not been completed in a transmission channel.

In other embodiments, the device at the transmitting end may send, to the device at the receiving end, information for releasing the at least two transmission channels after receiving indication from the device at the receiving end that all the data packets included in the group of data packets have been received by the device at the receiving end. Then after receiving confirmation from the device at the receiving end, may release the at least two transmission channel.

The at least two transmission channels may be released according to a procedure of the respective corresponding transmission protocols or actual requirements, and are not limited to the several manners in the foregoing examples.

Therefore, it may be seen that, by means of the data transmission method provided in this embodiment, a same group of data packets are transmitted simultaneously through transmission channels corresponding to multiple transmission protocols, and the multiple protocols may be but not limited to a combination of reliable and unreliable transmission protocols, and may simultaneously meet integrity and real-time service requirements of data transmission.

Figure 12:
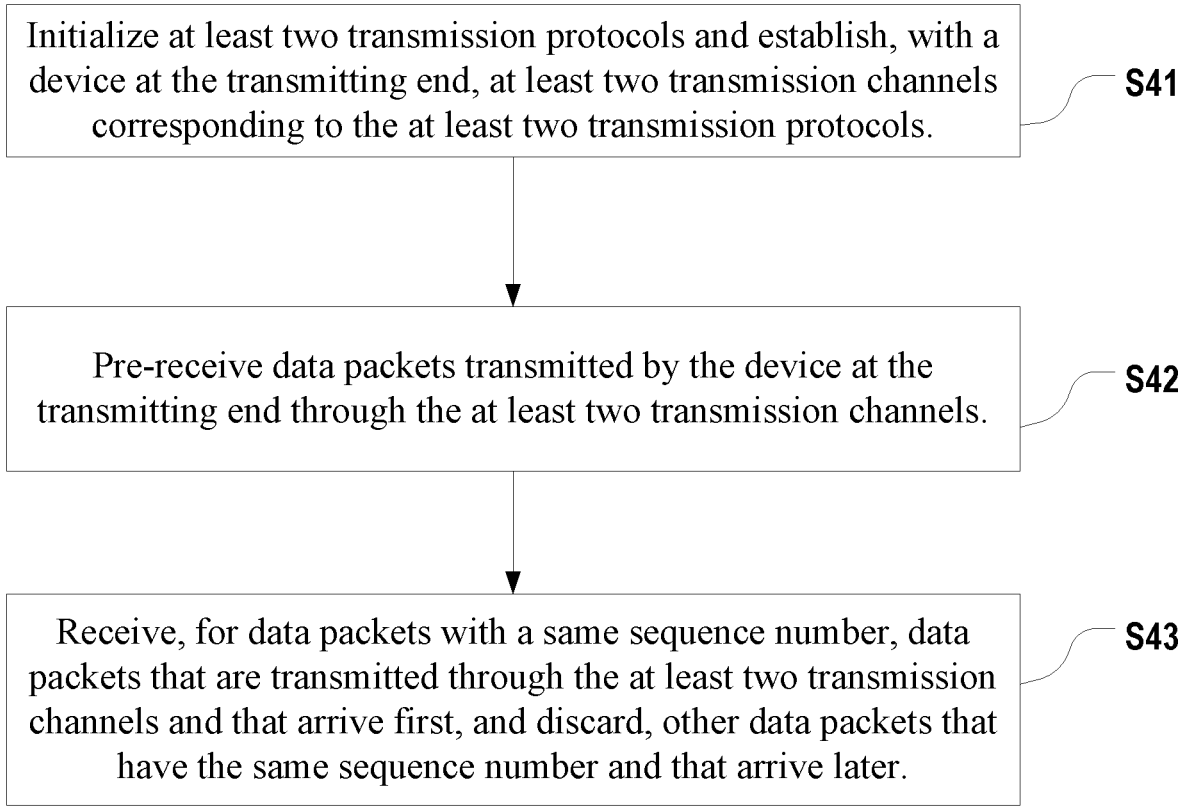
FIG. 12 is a flowchart of yet another data transmission method.

An embodiment of the present invention provides a data transmission method. The method is applicable to a device at the receiving end. FIG. 12 shows a flowchart of this method. Referring to FIG. 12, the method of this embodiment includes the following steps:

Step S41. Initialize at least two transmission protocols and establish, with a device at the transmitting end, at least two transmission channels corresponding to the at least two transmission protocols.

In this step, when the device at the receiving end needs to receive a group of data packets sent by the device at the transmitting end, the device at the receiving end initializes at least two transmission protocols and establishes, with the device at the transmitting end, at least two transmission channels corresponding to the at least two transmission protocols, where one transmission channel corresponds to one transmission protocol. The at least two transmission channels are all used for transmitting a same group of data packets, each data packet in the group of data packets has a corresponding sequence number, and the group of data packets are pre-copied into multiple groups, so that one transmission channel is used for transmitting one group of data packets. Sequence numbers of same data packets are the same in each group of data packets obtained through the copying.

For example, assuming that the device at the receiving end includes the three transmission protocols: the TCP, the UDP, and the Bluetooth SPP, and correspondingly, the device at the transmitting end also has the three transmission protocols: the TCP, the UDP, and the Bluetooth SPP. The device at the receiving end and the device at the transmitting end may select, according to actual situations, any two transmission protocols of the three transmission protocols: two of the TCP, the UDP, and the Bluetooth SPP to transmit data, and establish two transmission channels; or transmit data by using the three transmission protocols: the TCP, the UDP, and the Bluetooth SPP, and establish three transmission channels. When both the device at the receiving end and the device at the transmitting end have a larger quantity of transmission protocols, more than three transmission protocols may be used for transmitting data. In this case, more transmission channels need to be established.

Step S42. Pre-receive data packets transmitted by the device at the transmitting end through the at least two transmission channels.

In this step, the device at the receiving end pre-receives the data packets transmitted by the device at the transmitting end through the at least two transmission channels. For example, if the device at the receiving end and the device at the transmitting end have established two transmission channels: a first transmission channel (for example, established according to the TCP) and a second transmission channel (for example, established according to the UDP), the first transmission channel is used for transmitting the group of data packets, and the second transmission channel is used for transmitting the other group of data packets that are obtained through copying from the group of data packets and that are the same as the group of data packets. Sequence numbers of same data packets are the same in two groups of data packets.

Further, the length of each data packet in the group of data packets is not greater than the length of a data packet whose length is the smallest of the maximum allowed data packet length among the at least two transmission protocols. Still using the foregoing example for description, if the maximum length of a data packet that is allowed to be transmitted by a first transmission protocol corresponding to the first transmission channel and that does not need to be segmented is 1480 bytes, and the maximum length of a data packet that is allowed to be transmitted by a second transmission protocol corresponding to the second transmission channel and that does not need to be segmented is 1472 bytes, the length of the data packet that is allowed to be transmitted by the second transmission protocol and that does not need to be segmented is the minimum, so that the length of each data packet in the group of data packets should be not greater than the maximum length of the data packet that is allowed to be transmitted by the second transmission protocol. In this example, no data packet is allowed to be longer than 1472 bytes.

Step S43. Receive, for data packets with a same sequence number, data packets that are transmitted through the at least two transmission channels and that arrive first, and discard, other data packets that have the same sequence number and that arrive later.

In this step, the device at the receiving end receives, for data packets with a same sequence number, data packets that are transmitted through the at least two transmission channels and that arrive first, and discards, other data packets that have the same sequence number and that arrive later. That is, the receiving principle of "receive the first, discard the later" is used.

Therefore, it may be seen that, by means of the data transmission method provided in this embodiment, a same group of data packets are transmitted simultaneously through transmission channels corresponding to multiple transmission protocols, and the multiple protocols may be but not limited to a combination of reliable and unreliable transmission protocols, and may simultaneously meet integrity and real-time service requirements of data transmission.

Figure 13:
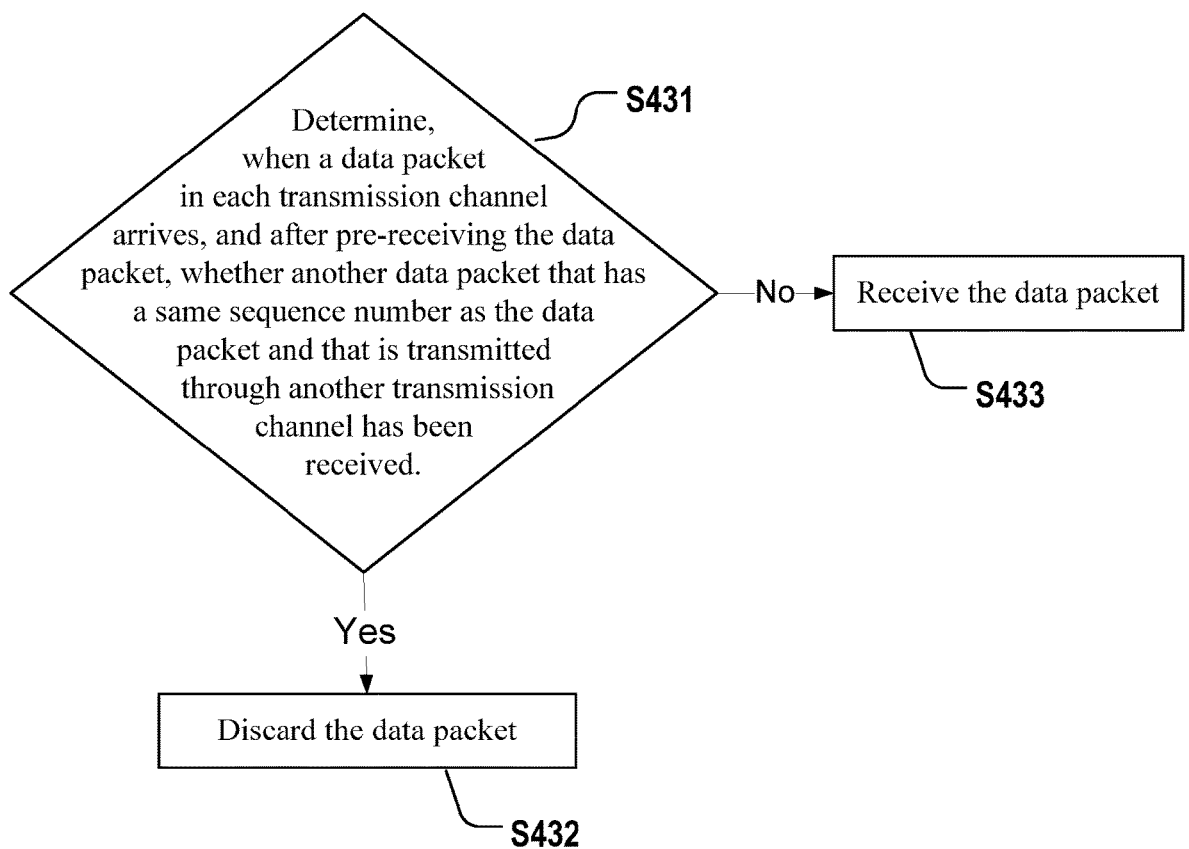
FIG. 13 is a flowchart of step S43 in FIG. 12.

Further, referring to FIG. 13, FIG. 13 is a schematic flowchart of main substeps of step S43 of this embodiment. Step S43 includes the following substeps:

Step S431. Determine, when a data packet in each transmission channel arrives, and after pre-receiving the data packet, whether another data packet that has a same sequence number as the data packet and that is transmitted through another transmission channel has been received.

In this step, after pre-receiving each data packet transmitted through each transmission channel, the device at the receiving end confirms that a sequence number of a data packet that arrives currently, and determines whether another data packet that has a same sequence number as the current data packet and that is transmitted through another transmission channel has been received; if determining that the other data packet has been received, performs step S432; and if determining that the other data packet has not been received, performs step S433.

Step S432. Discard the data packet.

In this step, if determining that the other data packet that has the same sequence number as the current data packet and that is transmitted through the other transmission channel has been received, the device at the receiving end discards the data packet that arrives currently.

Step S433. Receive the data packet.

In this step, if determining that the other data packet that has the same sequence number as the current data packet and that is transmitted through the other transmission channel has not been received, the device at the receiving end receives the data packet.

Figure 14:
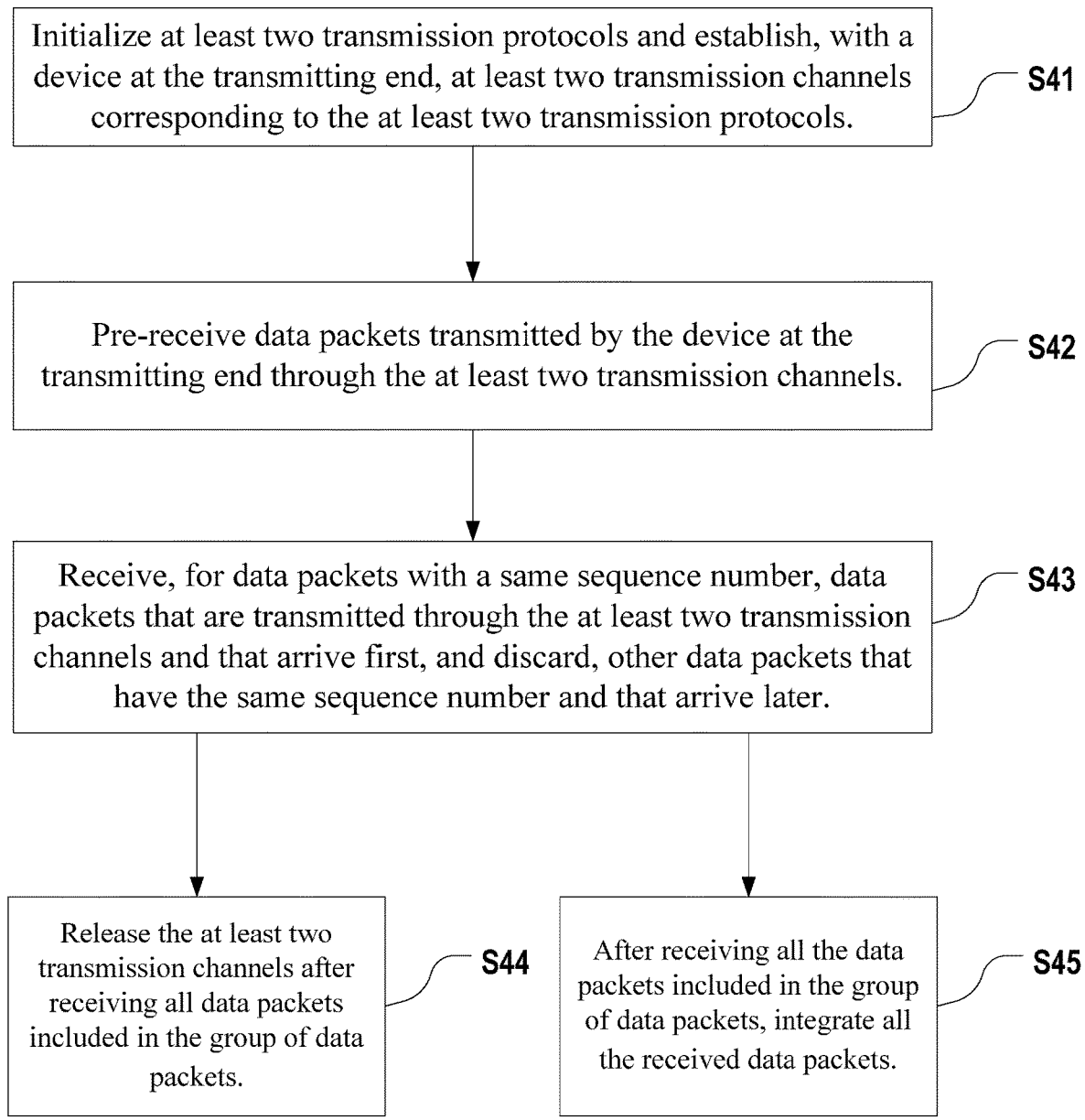
FIG. 14 is a flowchart of a another data transmission method.

An embodiment of the present invention provides a data transmission method. FIG. 14 shows a flowchart of this method. Referring to FIG. 14, the method of this embodiment includes the following steps:

Step S41. Initialize at least two transmission protocols and establish, with a device at the transmitting end, at least two transmission channels corresponding to the at least two transmission protocols.

Step S42. Pre-receive data packets transmitted by the device at the transmitting end through the at least two transmission channels.

Step S43. Receive, for data packets with a same sequence number, data packets that are transmitted through the at least two transmission channels and that arrive first, and discard, other data packets that have the same sequence number and that arrive later.

For the foregoing step S41 to step S43, reference may be made to the embodiment shown in FIGS. 12-13. Details are not described herein again.

Step S44. Release the at least two transmission channels after receiving all data packets included in the group of data packets.

In this step, the device at the receiving end releases the at least two transmission channels after receiving all the data packets included in the group of data packets. Further, the device at the receiving end further sends information that all the data packets included in the group of data packets have been received to the device at the transmitting end.

Moreover, after all data packets included in a group of data packets in each transmission channel arrive at the device at the receiving end, the device at the receiving end may release the at least two transmission channels simultaneously or separately; or after receiving all the data packets included in the group of data packets, the device at the receiving end releases all transmission channels of the at least two transmission channels no matter whether transmission of all the data packets has not been completed in a transmission channel.

Step S45. After receiving all the data packets included in the group of data packets, integrate all the received data packets.

In this step, after receiving all the data packets included in the group of data packets, the device at the receiving end integrates all the received data packets, to integrate all the received data packets into a group of data packets or recover all the received data packets to data before being segmented by the device at the transmitting end.

Figure 15:
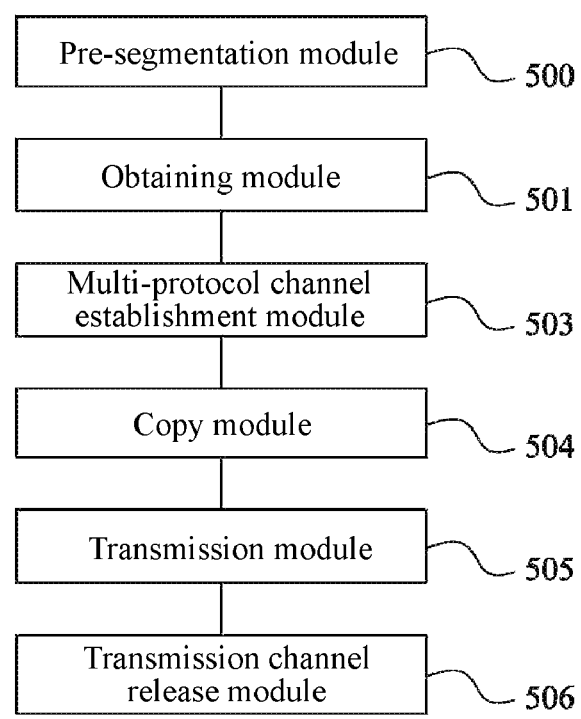
FIG. 15 shows a block diagram of a data transmission apparatus.

An embodiment of the present invention provides a data transmission apparatus. The apparatus may run in a device at the transmitting end, configured to implement the data transmission methods above. As shown in FIG. 15, the apparatus includes an obtaining module 501, a multi-protocol channel establishment module 503, a copy module 504, a transmission module 505, and a transmission channel release module 506.

The obtaining module 501 is configured to obtain a group of data packets. The obtaining module 501 obtains a group of data packets to be transmitted to a device at the receiving end, where the group of data packets include at least one data packet. Each data packet is small data that does not need to be segmented according to a transmission protocol. Each data packet in the group of data packets has a corresponding sequence number.

The multi-protocol channel establishment module 503 is configured to initialize at least two transmission protocols, and establish, with the device at the receiving end, at least two transmission channels corresponding to the at least two transmission protocols, where one transmission channel corresponds to one transmission protocol.

The copy module 504 is configured to copy the group of data packets into multiple groups of data packets according to a quantity of the at least two transmission channels, where sequence numbers of same data packets are the same in each group of data packets obtained through the copying.

The transmission module 505 is configured to transmit the multiple groups of data packets obtained through the copying to the device at the receiving end simultaneously through the at least two transmission channels, where one group of data packets is transmitted through one transmission channel. Specifically, the transmission module 505 transmits the multiple groups of data packets obtained through the copying to the device at the receiving end through the at least two transmission channels, that is, transmits, in a multi-protocol simultaneous transmission manner, the group of data packets obtained by the obtaining module 501. For example, if the device at the transmitting end and the device at the receiving end have established two transmission channels: a first transmission channel (for example, established according to the TCP) and a second transmission channel (for example, established according to the UDP), a quantity of the multiple groups of data packets is two, the first transmission channel is used for transmitting one group of data packets, and the second transmission channel is used for transmitting the other group of data packets.

Further, the length of each data packet in the group of data packets is not greater than the length of a data packet whose length is the smallest of the maximum allowed data packet lengths among the at least two transmission protocols. Still using the foregoing example for description, if the maximum length of a data packet that is allowed to be transmitted by a first transmission protocol corresponding to the first transmission channel and that does not need to be segmented is 1480 bytes, and the maximum length of a data packet that is allowed to be transmitted by a second transmission protocol corresponding to the second transmission channel and that does not need to be segmented is 1472 bytes, the length of the data packet that is allowed to be transmitted by the second transmission protocol and that does not need to be segmented is the minimum, so that the length of each data packet in the group of data packets should be not greater than the maximum length of the data packet that is allowed to be transmitted by the second transmission protocol. In this example, no data packet is allowed to be longer than 1472 bytes.

The transmission channel release module 506 is configured to release the at least two transmission channels after information that all data packets included in the group of data packets have been received and that is sent by the device at the receiving end is received. After the device at the transmitting end receives the information that all the data packets included in the group of data packets have been received from the device at the receiving end, the transmission channel release module 506 releases the at least two transmission channels. After the device at the transmitting end receives the information that all the data packets included in the group of data packets have been received from the device at the receiving end, the transmission channel release module 506 may simultaneously or separately release the at least two transmission channels after all data packets in a group of data packets in each transmission channel arrive at the device at the receiving end; or after the device at the receiving end receives all the data packets included in the group of data packets, the transmission channel release module 506 releases all transmission channels of the at least two transmission channels no matter whether transmission of all the data packets has not been completed in a transmission channel.

In other embodiments, the device at the transmitting end may also release the at least two transmission channels after receiving the information that all the data packets included in the group of data packets have been received and that is sent by the device at the receiving end, and after the transmission channel release module 506 sends, to the device at the receiving end, information for releasing the at least two transmission channels and further receives confirmation information of the device at the receiving end.

The at least two transmission channels may be released according to a procedure of the respective corresponding transmission protocols or actual requirements, and are not limited to the several manners in the foregoing examples.

In addition, the data transmission apparatus further includes a pre-segmentation module 500, configured to pre-segment data to obtain the group of data packets. A segmentation standard is to meet that the length of each data packet in the group of data packets is not greater than the length of a data packet whose length is the smallest of maximum allowed data packet lengths among the at least two transmission protocols, and both the device at the transmitting end and the device at the receiving end include the at least two transmission protocols, and simultaneously transmit the group of data packets through the at least two transmission protocols.

Therefore, it may be seen that, by means of the data transmission apparatus provided in this embodiment, a same group of data packets are transmitted simultaneously through transmission channels corresponding to multiple transmission protocols, and the multiple protocols may be but not limited to a combination of reliable and unreliable transmission protocols, and may simultaneously meet integrity and real-time service requirements of data transmission.

Figure 16:
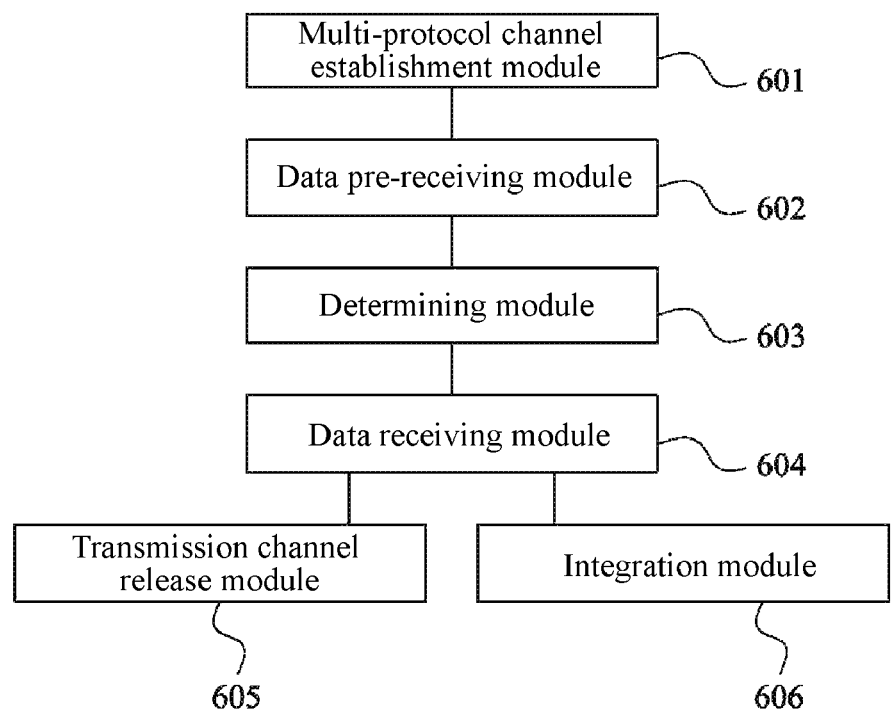
FIG. 16 is a block diagram of another data transmission apparatus.

An embodiment of the present invention provides a data transmission apparatus. The apparatus may run in a device at the receiving end, configured to implement the data transmission methods above. As shown in FIG. 16, the apparatus includes a multi-protocol channel establishment module 601, a data pre-receiving module 602, a determining module 603, a data receiving module 604, a transmission channel release module 605, and an integration module 606.

The multi-protocol channel establishment module 601 is configured to initialize at least two transmission protocols and establish, with a device at the transmitting end, at least two transmission channels corresponding to the at least two transmission protocols. When the device at the receiving end needs to receive a group of data packets sent by the device at the transmitting end, the multi-protocol channel establishment module 601 initializes the at least two transmission protocols and establishes, with the device at the transmitting end, the at least two transmission channels corresponding to the at least two transmission protocols, where one transmission channel corresponds to one transmission protocol. The at least two transmission channels are all used for transmitting a same group of data packets, each data packet in the group of data packets has a corresponding sequence number, and the group of data packets are pre-copied into multiple groups, so that one transmission channel is used for transmitting one group of data packets. Sequence numbers of same data packets are the same in each group of data packets obtained through the copying.

For example, assuming that the device at the receiving end includes the three transmission protocols: the TCP, the UDP, and the Bluetooth SPP, and correspondingly, the device at the transmitting end also has the three transmission protocols: the TCP, the UDP, and the Bluetooth SPP, the device at the receiving end and the device at the transmitting end may select, according to actual situations, any two transmission protocols of the three transmission protocols: two of the TCP, the UDP, and the Bluetooth SPP to transmit data, and establish two transmission channels; or transmit data by using the three transmission protocols: the TCP, the UDP, and the Bluetooth SPP, and establish three transmission channels. When both the device at the receiving end and the device at the transmitting end have a larger quantity of transmission protocols, more than three transmission protocols may be used for transmitting data. In this case, more transmission channels need to be established.

The data pre-receiving module 602 is configured to pre-receive data packets transmitted by the device at the transmitting end through the at least two transmission channels. Specifically, the data pre-receiving module 602 pre-receives the data packets transmitted by the device at the transmitting end through the at least two transmission channels. For example, if the device at the receiving end and the device at the transmitting end have established two transmission channels: a first transmission channel (for example, established according to the TCP) and a second transmission channel (for example, established according to the UDP), the first transmission channel is used for transmitting the group of data packets, and the second transmission channel is used for transmitting the other group of data packets that are obtained through copying from the group of data packets and that are the same as the group of data packets. Sequence numbers of same data packets are the same in two groups of data packets.

Further, the length of each data packet in the group of data packets is not greater than the length of a data packet whose length is the smallest of the maximum allowed data packet length among the at least two transmission protocols. Still using the foregoing example for description, if the maximum length of a data packet that is allowed to be transmitted by a first transmission protocol corresponding to the first transmission channel and that does not need to be segmented is 1480 bytes, and the maximum length of a data packet that is allowed to be transmitted by a second transmission protocol corresponding to the second transmission channel and that does not need to be segmented is 1472 bytes, the length of the data packet that is allowed to be transmitted by the second transmission protocol and that does not need to be segmented is the minimum, so that the length of each data packet in the group of data packets should be not greater than the maximum length of the data packet that is allowed to be transmitted by the second transmission protocol. In this example, no data packet is allowed to be longer than 1472 bytes.

The determining module 603 is configured to: determine, when a data packet in each transmission channel arrives at the device at the receiving end, and after the data pre-receiving module 602 pre-receives the data packet, whether another data packet that has a same sequence number as the data packet and that is transmitted through another transmission channel has been received; if determining that the other data packet has been received, instruct the data receiving module 604 to discard the data packet; and if determining that the other data packet has not been received, instruct the data receiving module 604 to receive the data packet. Specifically, after the data pre-receiving module 602 pre-receives each data packet transmitted through each transmission channel, the determining module 603 confirms that a sequence number of a data packet that arrives currently, and determines whether another data packet that has a same sequence number as the current data packet and that is transmitted through another transmission channel has been received; if the determining module 603 determines that the other data packet that has the same sequence number as the current data packet and that is transmitted through the other transmission channel has been received, instructs the data receiving module 604 to discard the data packet that arrives currently; and if the determining module 603 determines that the other data packet that has the same sequence number as the current data packet and that is transmitted through the other transmission channel has not been received, instructs the data receiving module 604 to receive the data packet.

The data receiving module 604 is configured to receive, for data packets with a same sequence number, data packets that are transmitted through the at least two transmission channels and that arrive first, and discard, other data packets that have the same sequence number and that arrive later. That is, the receiving principle of "receive the first, discard the later" is used.

The transmission channel release module 605 is configured to release the at least two transmission channels after the data receiving module 604 receives all data packets included in the group of data packets. The transmission channel release module 605 releases the at least two transmission channels after the data receiving module 604 receives all the data packets included in the group of data packets.

Moreover, the transmission channel release module 605 may simultaneously or separately release the at least two transmission channels after all data packets in a group of data packets in each transmission channel arrive at the device at the receiving end; or after the device at the receiving end receives all the data packets included in the group of data packets, the transmission channel release module 506 releases all transmission channels of the at least two transmission channels no matter whether transmission of all the data packets has not been completed in a transmission channel.

Further, the device at the receiving end further includes an information sending module (not shown in the figure), and the information sending module is used for sending information that all the data packets in the group of data packets have been received to the device at the transmitting end.

The integration module 606 is configured to integrate, after the data receiving module 604 receives all the data packets included in the group of data packets, all the received data packets, to integrate all the received data packets into a group of data packets or further recover all the received data packets Therefore, it may be seen that, by means of the data transmission apparatus provided in this embodiment, a same group of data packets are transmitted simultaneously through transmission channels corresponding to multiple transmission protocols, and the multiple protocols may be but not limited to a combination of reliable and unreliable transmission protocols, and may simultaneously meet integrity and real-time service requirements of data transmission.

An embodiment of the present invention provides a data transmission system, and the data transmission system includes a device at the transmitting end and a device at the receiving end. The device at the transmitting end includes the data transmission apparatus provided in the embodiment shown in FIG. 15, and the device at the receiving end includes the data transmission apparatus provided in the embodiment shown in FIG. 16.

By means of the data transmission system provided in this embodiment, a same group of data packets are transmitted simultaneously through transmission channels corresponding to multiple transmission protocols, and the multiple protocols may be but not limited to a combination of reliable and unreliable transmission protocols, and may simultaneously meet integrity and real-time service requirements of data transmission.

It should be noted that, description of each of the embodiments in this specification focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

It should be noted that, the terms "include", "comprise", and any variants thereof herein are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A data transmission method, comprising:
obtaining, by a device at a transmitting end, a group of data packets of a data, wherein the device at the transmitting end comprises a first processor in communication with a first memory, the first memory storing a first set of instructions executed by the first processor, and wherein the group of data packets comprise at least one data packet, and each of the group of data packets is identified by one of a set of sequence numbers;

initializing, by the device at the transmitting end, at least two parallel transport-layer transmission protocols that are distinct to one another, and establishing at least two transmission channels corresponding to the at least two parallel transport-layer transmission protocols with a device at a receiving end, wherein the device at the receiving end comprises a second processor in communication with a second memory, the second memory storing a second set of instructions executed by the second processor;

duplicating, by the device at the transmitting end, the group of data packets into multiple groups of data packets according to a number of transmission channels in the at least two transmission channels;

transmitting, by the device at the transmitting end, the multiple groups of data packets to the device at the receiving end, each group of the multiple groups of data packets via one of the at least two transmission channels independently and in parallel respectively using the two parallel transport-layer transmission protocols simultaneously; and releasing , by the device at the transmitting end, all of the at least two transmission channels after receiving information at the receiving end that all data packets of the group of data packets have been received, even if data packets transmitted by one of the at least two transmission channels has not been completed.

2. The data transmission method according to claim 1, wherein predefined maximum allowed data packet lengths are each specified for one of the at least two parallel transport-layer transmission protocols and wherein the length of each data packet in the group of data packets is not greater than the smallest of the predefined maximum allowed data packet lengths.

3. The method according to claim 2, further comprising pre-segmenting, by the device at the transmitting end, the data to obtain the group of data packets.

4. The data transmission method according to claim 1, further comprising:

receiving, by the device at the receiving end from the device at the transmitting end, successfully transmitted data packets of the multiple groups of data packets and retaining, from the successfully transmitted data packets, at most one data packet for each of the set of sequence numbers.

5. The data transmission method according to claim 4, wherein receiving, by the device at the receiving end from the device at the transmitting end, the successfully transmitted data packets of the multiple groups of data packets and retaining at most one data packet for each of the set of sequence numbers comprises:

determining, by the device at the receiving end, for a newly arriving data packet in one of the at least two transmission channels at the device at the receiving end, whether another data packet having a same sequence number as the newly arriving data packet and transmitted through another transmission channel of the at least two transmission channels has been received;

discarding, by the device at the receiving end, the newly arriving data packet upon determining that the another data packet has been received; and retaining, by the device at the receiving end, the newly arriving data packet upon determining that the another data packet has not been received.

6. The data transmission method according to claim 4, the method further comprising pre-segmenting, by the device at the transmitting end, the data to obtain the group of data packets.

7. The data transmission method according to claim 4, comprising: after receiving all data packets of the group of data packets, sending, by the device at the receiving end to the device at the transmitting end, information that all the data packets of the group of data packets have been received.

8. The method according to claim 4, wherein predefined maximum allowed data packet lengths are each specified for one of the at least two parallel transport-layer transmission protocols and wherein the length of each data packet in the group of data packets is not greater than the smallest of the predefined maximum data packet lengths.

9. The data transmission method according to claim 4, further comprising:

integrating, by the device at the receiving end, after receiving all data packets of the group of data packets, all the retained data packets.

10. A data transmission method, comprising:

initializing, by a device at a receiving end, at least two parallel transport-layer transmission protocols that are distinct to one another and establishing, with a device at a transmitting end, at least two transmission channels corresponding to the at least two parallel transport-layer transmission protocols, wherein the device at the receiving end comprises a processor in communication with a memory, the memory storing a set of instructions executed by the processor, wherein the at least two transmission channels are configured to transmit duplicated groups of data packets independently and in parallel respectively using the at least two parallel transport-layer transmission protocols simultaneously, and wherein each set of duplicated data packets in the duplicated groups of data packets are identified by a same one of a set of sequence numbers;

receiving, by the device at the receiving end from the device at the transmitting end, successfully transmitted data packets of the duplicated groups of data packets via the at least two transmission channels and retaining, from the successfully transmitted data packets, at most one data packet for each of the set of sequence numbers; and releasing, by the device at the transmitting end, all of the at least two transmission channels after receiving information at the receiving end that all data packets of the group of data packets have been received, even data packets transmitted by one of the at least two transmission channels has not been completed.

11. The data transmission method according to claim 10, wherein predefined maximum allowed data packet lengths are each specified for one of the at least two parallel transport-layer transmission protocols and wherein the length of each data packet in the duplicated groups of data packets is not greater than the smallest of the predefined maximum data packet lengths.

12. The data transmission method according to claim 10, comprising: after receiving all the data packets for the set of sequence numbers, sending, by the device at the receiving end to the device at the transmitting end, information that all the data packets for the set of sequence numbers have been received.

13. The data transmission method according to claim 10, further comprising:

integrating, by the device at the receiving end, after receiving all the data packets for the set of sequence numbers, all the received data packets according the set of sequence numbers.

14. The data transmission method according to claim 10, wherein receiving, by the device at the receiving end from the device at the transmitting end, successfully transmitted data packets of the duplicated groups of data packets and retaining at most one data packet for each of the set of sequence numbers comprises:
determining, by the device at the receiving end, for a newly arriving data packet in one of the at least two transmission channels at the device at the receiving end, whether another data packet that has a same sequence number as the newly arriving data packet and transmitted through another transmission channel of the at least two transmission channels has been received;
discarding, by the device at the receiving end, the newly arriving data packet upon determining that the another data packet has been received; and
retaining, by the device at the receiving end, the newly arriving data packet upon determining that the another data packet has not been received.

15. A data transmission system, comprising:
a device at a transmitting end comprising a first processor in communication with a first memory, the first memory storing a first set of instructions executed by the first processor; and
a device at a receiving end comprising a second processor in communication with a second memory, the second memory storing a second set of instructions executed by the second processor;
wherein the first processor, when executing the first set of instructions, is configured to cause the device at the transmitting end to:
obtain a group of data packets of a data comprising at least one data packet, wherein each of the group of data packets is identified by one of a set of sequence numbers;
initialize at least two parallel transport-layer transmission protocols that are distinct to one another and establish at least two transmission channels corresponding to the at least two parallel transport-layer transmission protocols with the device at the receiving end;
duplicate the group of data packets into multiple groups of data packets according to a number of transmission channels in the at least two transmission channels; and
transmit the multiple groups of data packets to the device at the receiving end, wherein each group of the multiple groups of data packets is transmitted via one of the at least two transmission channels independently and in parallel respectively using the two parallel transport-layer transmission protocols simultaneously; and
wherein the second processor, when executing the second set of instructions, is configured to cause the device at the receiving end to:
receive, from the device at the transmitting end, successfully transmitted data packets of the multiple groups of data packets; and
retain, from the successfully transmitted data packets, at most one data packet for each of the set of sequence numbers; and
where in the first processer and the second processor, when respectively executing the first set of instructions and the second set of instructions, are configured to further cause the device at the transmitting end and the device at the receiving end to release all of the at least two transmission channels after receiving information at the receiving end that all data packets of the group of data packets have been received, even data packets transmitted by one of the at least two transmission channels has not been completed.

16. The data transmission system of claim 15, wherein the second processor, when executing the second set of instruction to receive the successfully transmitted data packets of the multiple groups of data packets and retain at most one data packet for each of the set of sequence numbers, is configured to cause the device at the receiving end to:
determine for a newly arriving data packet in one of the at least two transmission channels at the device at the receiving end, whether another data packet having a same sequence number as the newly arriving data packet and transmitted through another transmission channel of the at least two transmission channels has been received;
discard the newly arriving data packet upon determining that the another data packet has been received; and
retain the newly arriving data packet upon determining that the another data packet has not been received.

17. The data transmission system of claim 16, wherein predefined maximum allowed data packet lengths are each specified for one of the at least two parallel transport-layer transmission protocols and wherein the length of each data packet in the group of data packets is not greater than the smallest of the predefined maximum allowed data packet lengths.

* * * * *